(12) United States Patent
Ikeda et al.

(10) Patent No.: US 7,136,527 B2
(45) Date of Patent: Nov. 14, 2006

(54) APPARATUS AND METHOD FOR EXTRACTING ARTIFICIAL IMAGES AND PROGRAM FOR PERFORMING THE METHOD

(75) Inventors: Masaru Ikeda, Chiba (JP); Tetsujiro Kondo, Tokyo (JP); Akihiro Okumura, Kanagawa (JP); Katsuhisa Shinmei, Tokyo (JP)

(73) Assignee: Sony Corporation, Tokyo (JP)

( * ) Notice: Subject to any disclaimer, the term of this patent is extended or adjusted under 35 U.S.C. 154(b) by 391 days.

(21) Appl. No.: 10/820,886

(22) Filed: Apr. 9, 2004

(65) Prior Publication Data

US 2004/0257477 A1    Dec. 23, 2004

(30) Foreign Application Priority Data

Apr. 11, 2003  (JP) .............................. 2003-108011

(51) Int. Cl.
   G06K 9/46   (2006.01)
   G06K 9/66   (2006.01)
(52) U.S. Cl. ................... 382/190; 382/199; 382/168
(58) Field of Classification Search ............... 382/168, 382/170, 190, 199, 275
See application file for complete search history.

(56) References Cited

U.S. PATENT DOCUMENTS 6,366,699 B1 *  4/2002  Kuwano et al. ............ 382/199
6,804,397 B1 * 10/2004  Kaneko et al. ............. 382/190
2002/0047935 A1  4/2002  Kondo et al.

FOREIGN PATENT DOCUMENTS

| JP | 2002-84458  | 3/2002 |
| JP | 2003-189264 | 7/2003 |
| JP | 2003-271970 | 9/2003 |

* cited by examiner

*Primary Examiner*—Phuoc Tran
(74) *Attorney, Agent, or Firm*—Oblon, Spivak, McClelland, Maier & Neustadt, P.C.

(57) ABSTRACT

A motion information output portion acquires horizontal motion information concerning a line where the telop is present. From a signal of the current frame and motion-compensated signal components of frames which are present before and after the current frame. A decision information acquisition portion and a binarizing processing portion obtains a flag indicating whether each pixel of a screen is pixel at edge position of the telop. Based on this flag, an edge pixel extraction portion extracts pixel data of the edge position. A histogram processing portion uses this pixel data as a material to create a histogram for each item of data, thereby determining values of the pixel data corresponding to the telop from a class having a largest frequency. An extraction region selection portion obtains another flag indicating a line where the telop is present. An extraction portion extracts pixel data corresponding to the telop.

11 Claims, 21 Drawing Sheets

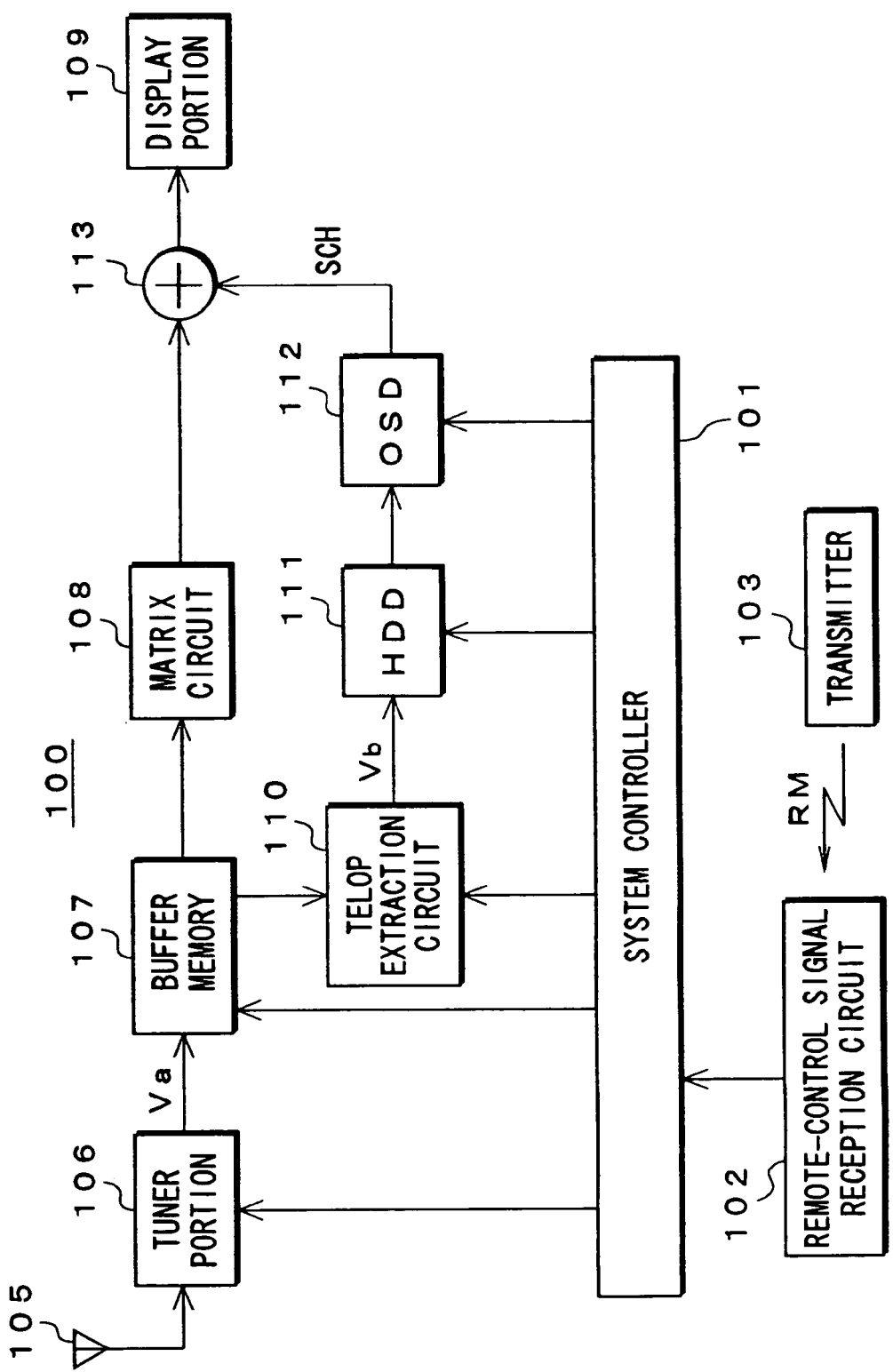

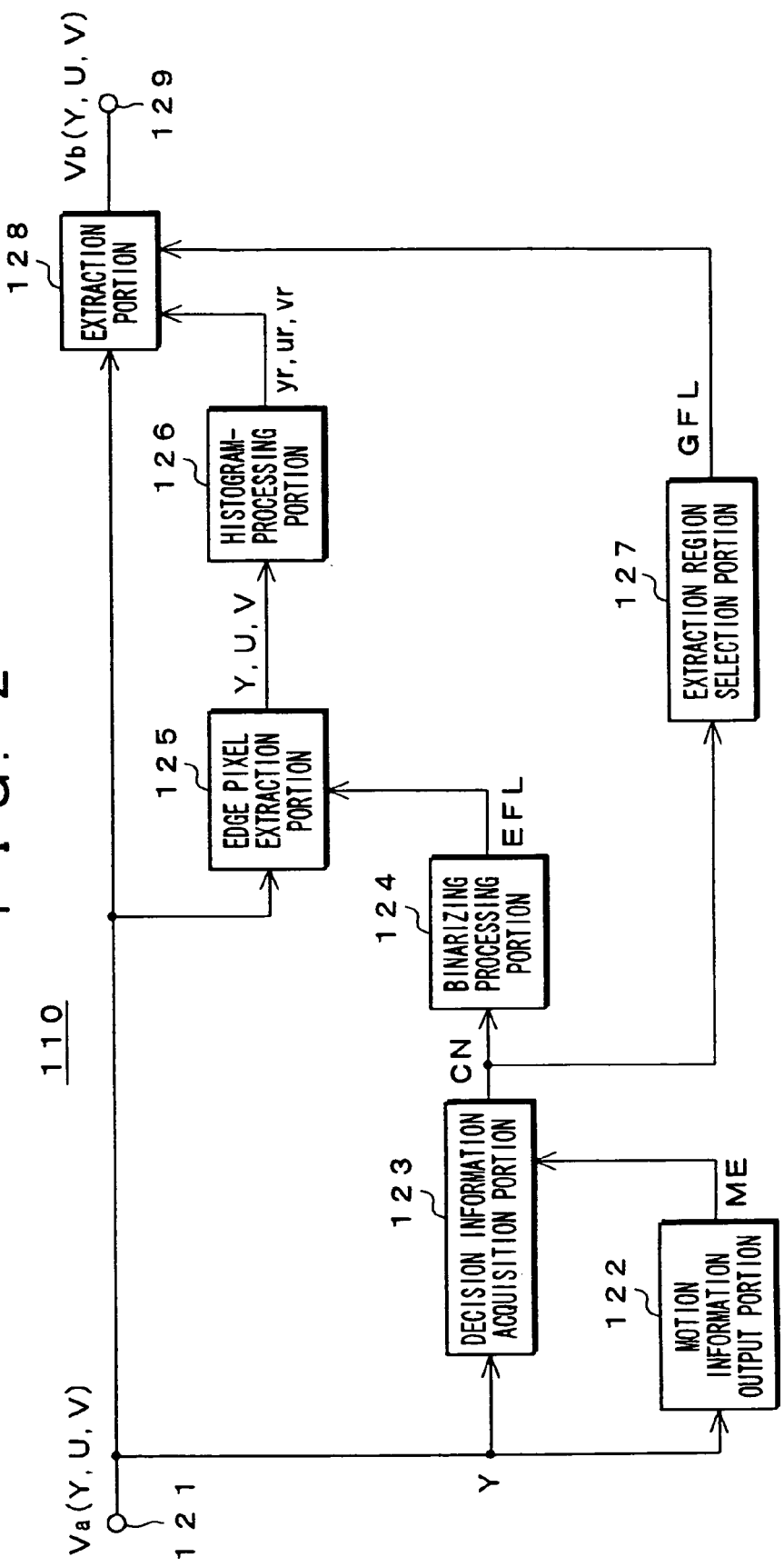

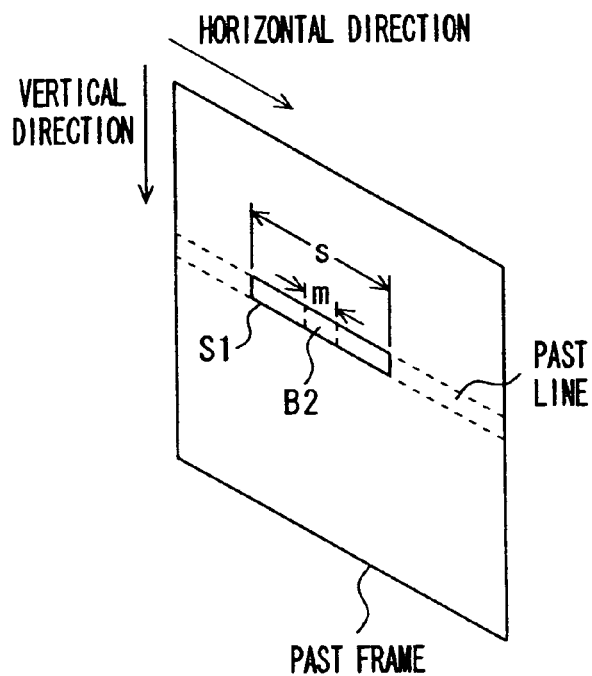
FIG. 3A
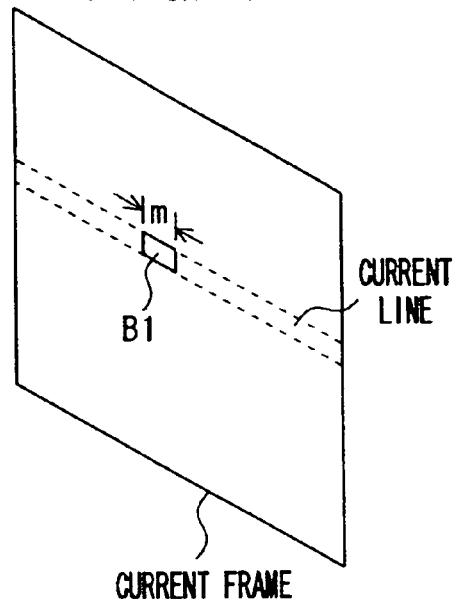
FIG. 3B
FIG. 5
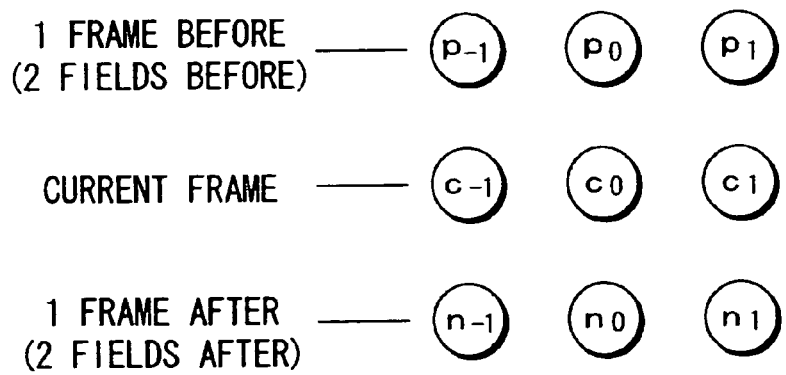

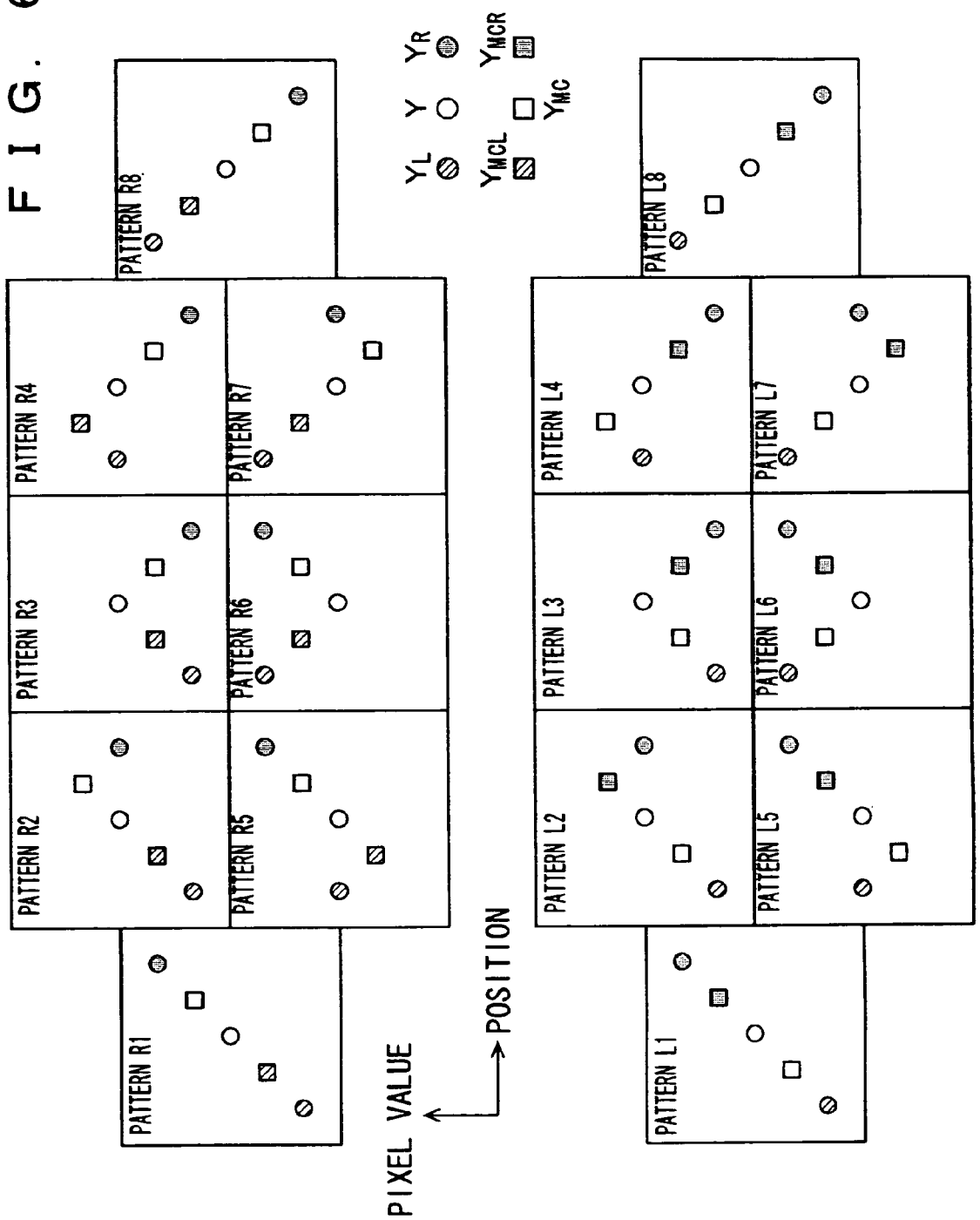

FIG. 7
1 LINE BEFORE —— 
CURRENT LINE ——   
1 LINE AFTER —— 
FIG. 8
HORIZONTAL DIRECTION 
VIRTICAL DIRECTION 
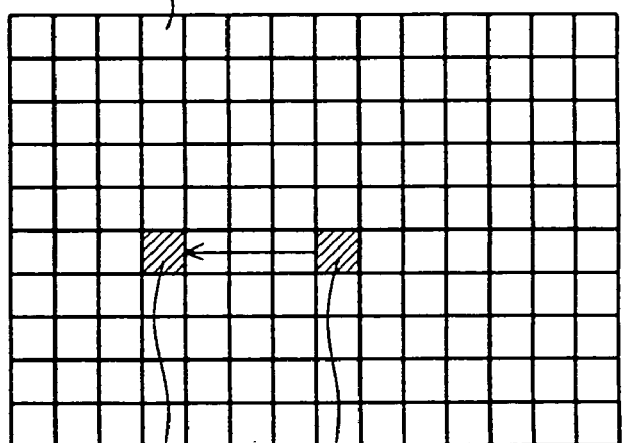

(Y)

...137, 131, 63, 191, 254, 254, 254, 254, 191, 63, 123...

(EFL)

...00111111110...

(Y)

...0, 0, 63, 191, 254, 254, 254, 254, 191, 63, 0...

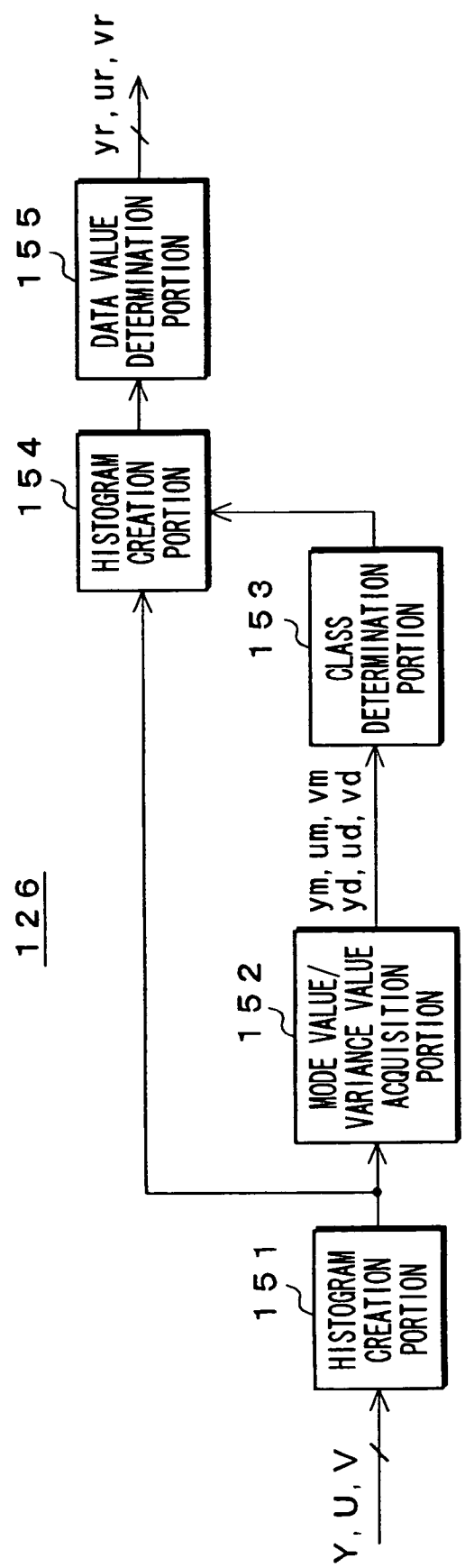

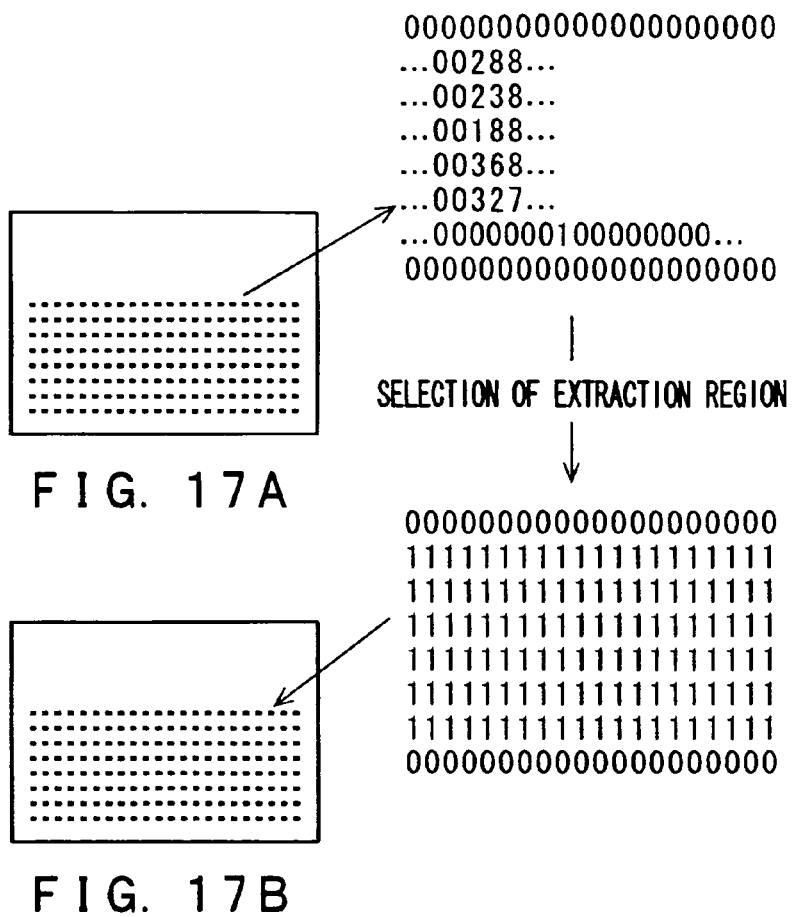
FIG. 17A
FIG. 17B
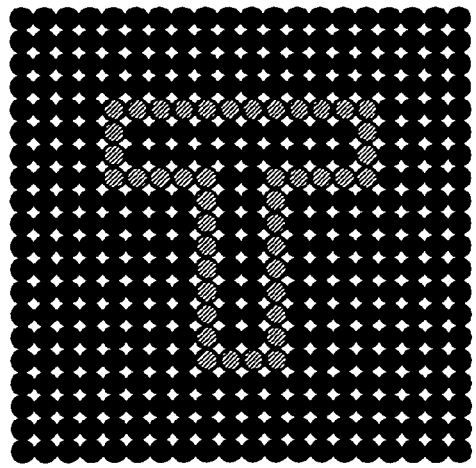
FIG. 24A
ORIGINAL IMAGE
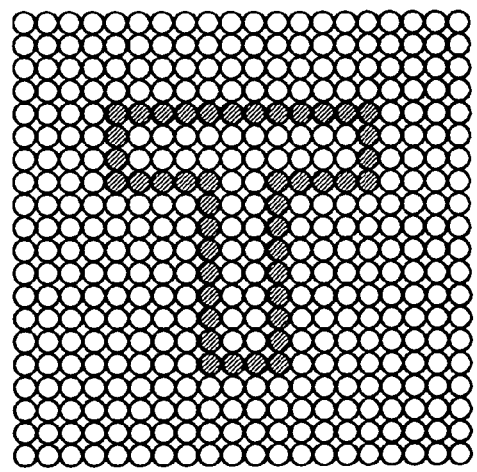
FIG. 24B

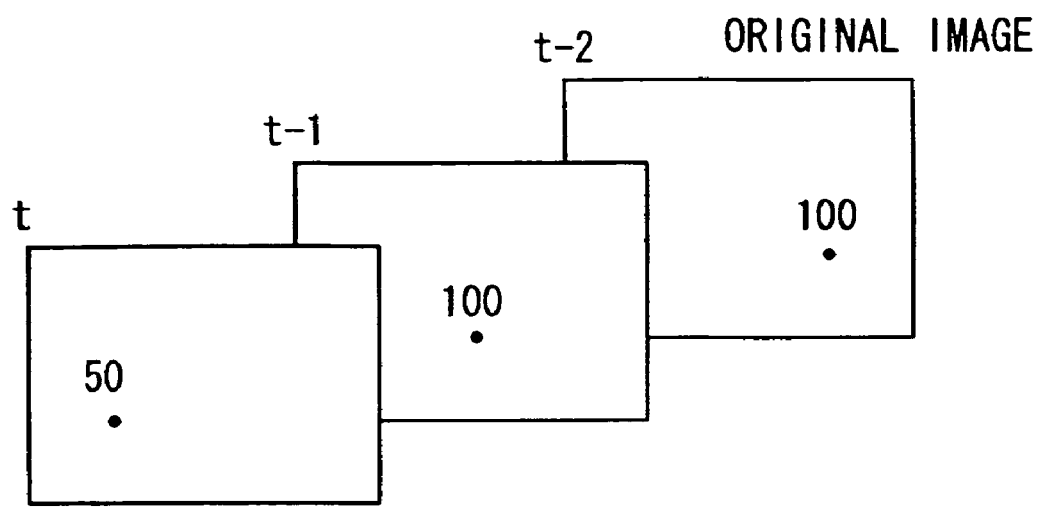
F I G. 22A
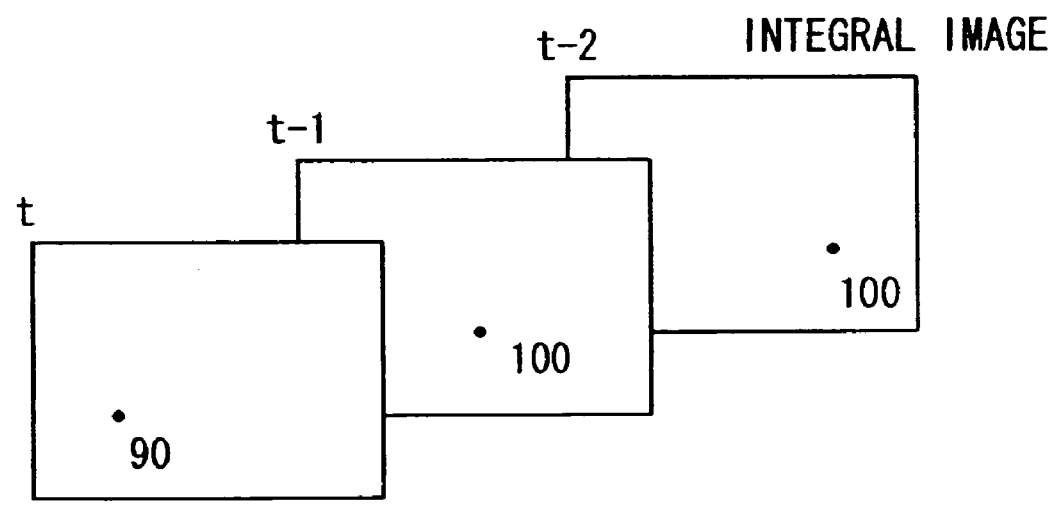
F I G. 22B

ORIGINAL IMAGE

APPARATUS AND METHOD FOR EXTRACTING ARTIFICIAL IMAGES AND PROGRAM FOR PERFORMING THE METHOD

BACKGROUND OF THE INVENTION

1. Field of the Invention

The present invention relates to an apparatus and a method for extracting artificial image such as a telop from an input image signal and a program for performing the method. Particularly, it relates to an apparatus and the like for extracting pixel data corresponding to the artificial image from the input image signal whose each piece of the pixel data is constituted of multiple items of color data.

2. Description of Related Art

In TV broadcasting, a moving telop (characters) has used to display a news flash and the like on a screen. If pixel data corresponding to an artificial image including such a telop is extracted from an image signal, it is possible to utilize this pixel data by, for example, accumulating it in a hard disk drive (HDD).

Conventionally, an apparatus has been proposed which extracts pixel data corresponding to a telop from an image signal (see Japanese Patent Application Publication No. 2000-182053). In this case, by utilizing telop properties of high luminance and color saturation with respect to a background, an edge position of a telop is detected on the basis of luminance and color saturation values. An average and a variance of luminance and color saturation values of a telop region including this edge position are then obtained, so that based on these average and variance, pixel data corresponding to the telop is extracted from an image signal.

Thus, the conventional apparatus detects an edge position of the telop based on luminance and color saturation values. It, however, cannot accurately detect the edge position of the telop on a level of the luminance and color saturation values. It is feared that only pixel data corresponding to the telop cannot be extracted from an image signal properly.

It is an object of the present invention to provide an apparatus and the like for extracting only pixel data corresponding to an artificial image properly from an input image signal.

SUMMARY OF THE INVENTION

According to an aspect of the present invention, an apparatus for extracting pixel data corresponding to an artificial image, for example, a telop, from an input image signal whose each piece of pixel data is constituted of multiple items of color data comprises a motion-information-outputting unit, a motion compensation unit, a detecting unit, an edge pixel extractor, a histogram processor, an extraction region selector, and an extractor.

For example, the pixel data of the input image signal is constituted of luminance data Y, blue color difference data U, and red color difference data V. Alternatively, the pixel data is constituted of, for example, red data R, green data G, and blue data B.

The motion-information-outputting unit outputs information of a horizontal moving distance in a line where the artificial image is present on a screen obtained from the input image signal. For example, each line is detected on whether it has an edge based on a luminance value and, if such is the case, defined as a line where an artificial image is present. Then, a block matching method and the like are utilized to obtain information of a horizontal moving distance therein.

The motion compensation unit performs motion compensation on signal components of frames, which are present in timing before and after a current frame of the input image signal, based on the information of the moving distance output from the motion-information-outputting unit. As the signal components of the frames present in timing before and after the current frame, signal components coming one frame before and coming one frame after are used respectively.

The detecting unit detects whether each pixel of a screen obtained from a signal component of the current frame of the input image signal is a pixel that is present at an edge position of the artificial image, based on the signal component of the current fame of the input image signal and the signal components, which have been compensated in terms of motion by the motion compensation unit, of the frames which are present in timing before and after the current frame of the input image signal. For example, whether each pixel in the obtained screen is a pixel of a position corresponding to the artificial image is detected on the basis of a pattern indicating a relationship in level among multiple items of pixel data positioned in the vicinity of a target position in each of the current frame of the input image signal and the frames thereof, which come before and after this current frame in timing respectively. Thus, the detection using a pattern allows it to be accurately detected whether each pixel of the target position is a pixel corresponding to an artificial image even if there is a compensation residual difference not larger than a pixel caused by motion compensation.

Based on a result of the detection on whether each pixel of the screen is a pixel of an edge position of an artificial image, a count value of a counter corresponding to each pixel of the screen is updated. Then, the count value of the counter is binarized, so that an edge position flag is obtained as a final decision result. The edge position flag indicates whether each pixel of a screen obtained from the signal of the current frame of the input image signal is a pixel of an edge position of an artificial image.

Thus, without using as it is a result of the detection on whether each pixel of a screen is a pixel of an edge position of an artificial image, which has been made on the basis of a signal component of a current frame and signal components of motion-compensated frames coming before and after the current frame in timing, it is possible to update a count value of a counter corresponding to each of the pixels of the screen for each frame based on this decision result and binarize this count value to define as a final decision result the edge position flag, which indicates whether each pixel of the screen is a pixel of the edge position of the artificial image, thereby improving a reliability of the decision result.

The edge pixel extractor extracts pixel data corresponding to the pixel of the edge position of the artificial image among items of pixel data constituting the signal component of the current frame of the input image signal, based on a detection result of the detecting unit.

The histogram processor creates a histogram using the items of pixel data extracted by the edge pixel extractor. It also obtains data values of multiple items of color data that constitutes the pixel data corresponding to the artificial image, based on the histogram.

For example, based on the pixel data corresponding to the extracted pixel of the edge position of the artificial image, for each of the multiple items of color data, the data value as a variable is sub-divided into a predetermined number of classes to create a histogram which uses, as a frequency, the number of items of the data belonging to each of the classes.

Data value corresponding to a class, which indicates maximum frequency for each histogram, is data value of multiple items of color data that constitutes pixel data corresponding to the artificial image.

Thus, using a one-dimensional histogram for respective multiple items of color data allows a hardware scale to be greatly cut, as compared to a method of using a multi-dimensional, for example, three-dimensional histogram for multiple items of color data as a whole. In such a case, only pixel data that corresponds to a pixel of an edge position of the artificial image is used as a material, so that a result obtained using a one-dimensional histogram is not different from that obtained using a three-dimensional histogram.

A width of a class of a histogram for each item of the color data is determined on the basis of a variance value of this color data. Even if there are fluctuations in the data values of the color data that constitutes pixel data corresponding to a pixel of an edge position of the artificial image, it is possible to obtain data values of multiple items of color data that constitutes pixel data corresponding to an artificial image properly.

Further, the extraction region selector selects an extraction region flag, which enters one state in accordance with the line where the artificial image is present in the screen obtained by the input image signal. For example, based on a count value of a counter corresponding to each pixel of a screen, the extraction region flag is created which enters one state, for example, "1" in accordance with a line in which the artificial image is present.

Additionally, the extractor extracts pixel data, from items of pixel data that constitute a signal component of a current frame of the input image signal, of the line by which the extraction region flag selected by the extraction region selector enters the one state and which is constituted of multiple items of color data matching a data value obtained by the histogram processor, as the pixel data corresponding to the artificial image.

Thus, an edge position of the artificial image is detected utilizing properties and the like of motion of the artificial image, data values of multiple items of the color data that constitutes pixel data corresponding to the artificial image are obtained from a histogram created using pixel data of this edge position, and the pixel data corresponding to the artificial image is extracted using the data values of the multiple items of color data, thereby allowing only such pixel data corresponding to the artificial image to be extracted properly from an input image signal.

According to another aspect of the present invention, data corrector for performing correction processing on first pixel data which is extracted by the edge pixel extractor is further comprised on the upstream side of the histogram processor. The data corrector holds second pixel data that serves as integration data in storage unit. Based on the information of above-mentioned moving distance, the second pixel data corresponding to the first pixel data, which has been written one frame before in timing, is read out of this storage unit, so that this second pixel data and the first pixel data are mixed at a predetermined mixing ratio to obtain output pixel data as corrected. Further, this output pixel data is written as second pixel data in the storage unit so that it is used in the next frame.

Thus, providing the data corrector allows effects of cross colors and noise to be suppressed when values of multiple items of color data that constitutes pixel data corresponding to an artificial image are obtained.

According to further aspect of the present invention, a method for extracting pixel data corresponding to an artificial image from an input image signal whose each item of pixel data is constituted of multiple items of color data comprises the following steps.

Information of a horizontal moving distance in a line where the artificial image is present on a screen obtained from the input image signal is first obtained.

Motion compensation is performed on signal components of frames, which are present in timing before and after a current frame of the input image signal, based on the information of the moving distance obtained at above step.

It is then decided whether each pixel in a screen obtained from a signal component of the current frame of the input image signal is pixel that is present at an edge position of the artificial image, based on the signal component of the current fame of the input image signal and the signal components, which have been motion-compensated, of the frames which are present in timing before and after the current frame of the input image signal.

Is extracted pixel data corresponding to the pixel of the edge position of the artificial image among items of the pixel data constituting the signal component of the current frame of the input image signal, based on the above a decision result.

A histogram is created using the items of pixel data extracted at the above step and, based on the histogram, data values of multiple items of color data that constitutes the pixel data corresponding to the artificial image.

An extraction region flag which enters one state in accordance with the line where the artificial image is present in the screen obtained from the input image signal is then selected.

Finally, pixel data of the line by which the extraction region flag selected by the above step enters the one state and which is constituted of the multiple items of color data matching a data value obtained by the above step is extracted among items of pixel data that constitutes a signal component of the current frame of the input image signal, as the pixel data corresponding to the artificial image.

According to still further aspect of the present invention, a program and a computer program stored in a storage medium are used to cause a computer to perform the above-mentioned method for extracting the artificial image.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 1 is a block diagram for showing a configuration of a TV receiver according to an embodiment of the present invention;

FIG. 2 is a block diagram for showing a configuration of a telop extraction circuit;

FIGS. 3A and 3B are illustrations each for explaining block matching processing;

FIG. 5 is an illustration for explaining a decision on whether target pixel is present at a position corresponding to a telop;

FIG. 6 is an illustration for explaining a pattern decision on whether target pixel is present at a position corresponding to a telop;

FIG. 7 is an illustration for explaining an edge decision;

FIG. 8 is an illustration for explaining updating operations at a counter portion;

FIG. 13. is a block diagram for showing a configuration of a histogram-processing portion;

FIGS. 17A and 17B are illustrations each for showing one example of selection processing performed by an extraction region selection portion;

FIGS. 22A and 22B are illustrations each for showing one example of data correction processing;

FIGS. 24A and 24B are illustrations each for explaining a case where a target telop is comprised of only an edge.

DETAILED DESCRIPTION OF THE PREFERRED EMBODIMENTS

Figure 4:
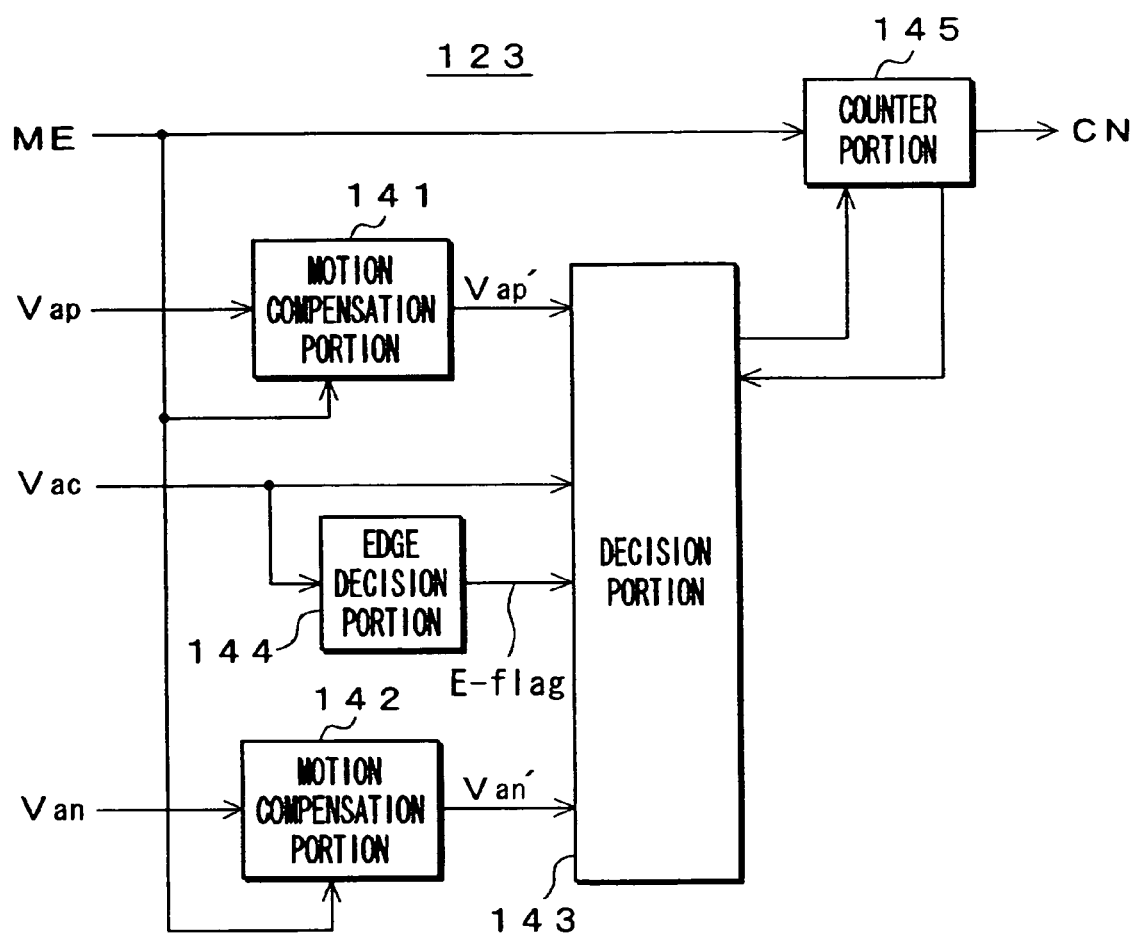
FIG. 4 is a block diagram for showing a configuration of a decision information acquisition portion.

The following will describe embodiments of the present invention with reference to drawings. FIG. 1 shows a configuration of a TV receiver 100 according to an embodiment of the present invention.

This TV receiver 100 comprises a microcomputer and has a system controller 101 for controlling operations of an entire system and a remote-control signal reception circuit 102 for receiving a remote-control signal. The remote-control signal reception circuit 102 is connected to the system controller 101. It is arranged to receive a remote-control signal RM that is output from a remote-control transmitter 103 in accordance with user operations and supply the system controller 101 with an operation signal which corresponds to this signal RM.

Further, the TV receiver 100 also has a reception antenna 105, a tuner portion 106 for receiving a broadcasting signal (RF-modulated signal) captured by this reception antenna 105 and performing station selection processing, intermediate frequency amplification processing, detection processing and the like to obtain an image signal Va, and a buffer memory 107 for storing the image signal Va output from this tuner portion 106 temporarily.

It is to be noted that items of pixel data constituting the image signal Va are each constituted of multiple items of color data. According to the present embodiment, pixel data Va is constituted of luminance data Y, blue color difference data U, and red color difference data V.

Further, the TV receiver 100 has a matrix circuit 108 for converting the luminance data Y, the blue color difference data U, and the red color difference data V of pixel data which constitutes the image signal Va read out of the buffer memory 107 into red data R, green data G, and blue data B and a display portion 109 for displaying an image due to the image signal Va which is output from this matrix circuit 108. This display portion 109 is constituted of a flat panel display such as a cathode-ray tube (CRT) display, a liquid crystal display (LCD), or a plasma display panel (PDP).

Further, the TV receiver 100 has a telop extraction circuit 110 for extracting pixel data corresponding to an artificial image (hereinafter referred to as "telop") such as a telop from the image signal Va read out of the buffer memory 107 and a hard disk drive (HDD) 111 for storing an image signal Vb constituted of pixel data extracted from this telop extraction circuit 110.

Further, the TV receiver 100 has an on-screen display (OSD) circuit 112 for creating a display signal SCH, which is used to display a telop on a screen of the display portion 109, based on the image signal Vb stored in the HDD 111 and a synthesizer 113 for synthesizing the display signal SCH output from this OSD circuit 112 into the image signal Va output from the matrix circuit 108 as described above and supplying it to the display portion 109.

The following will describe operations of the TV receiver 100 shown in FIG. 1.

The image signal Va output from the tuner portion 106 is supplied to the buffer memory 107 where it is temporarily stored. The image signal Va thus stored in the buffer memory 107 is then read out and supplied via the matrix circuit 108 and the synthesizer 113 to the display portion 109. In such a manner, an image due to the image signal Va is displayed on the screen of the display portion 109.

Further, the image signal Va stored in the buffer memory 107 is then read out and supplied to the telop extraction circuit 110. This telop extraction circuit 110 in turn extracts pixel data corresponding to a telop from the image signal Va. The image signal Vb constituted of the pixel data thus extracted by the telop extraction circuit 110 is supplied to the HDD 111 and stored in it.

Then, in the case of displaying a telop on the display portion 109 based on the image signal Vb stored in the HDD 111, a user performs necessary operations using the remote-control transmitter 103, for example. In this case, the image signal Vb stored in the HDD111 is read out thereof and supplied to the OSD circuit 112. The OSD circuit 112 creates the display signal SCH for displaying the telop, based on the image signal Vb. The display signal SCH is supplied to the synthesizer 113 where it is synthesized into the image signal Va. Accordingly, an image due to the image signal Va is displayed on the screen of the display portion 109 and a telop due to the display signal SCH is also displayed with it being superimposed on a part of this image signal Va.

The following will describe details of the telop extraction circuit 110. FIG. 2 shows a configuration of the telop extraction circuit 110.

This telop extraction circuit 110 has an input terminal 121 for receiving the image signal Va from the buffer memory 107 and a motion information output portion 122 for outputting motion information ME that indicates a horizontal moving distance in a line where a telop is present in a screen obtained from the image signal Va received by this input terminal 121.

This motion information output portion 122 outputs the motion information ME by performing the following processing. As described above, pixel data constituting the image signal Va is comprised of luminance data Y, blue color difference data U, and red color difference data U. In processing by this motion information output portion 122, for example, only the luminance data Y is used. This holds true also with processing by a decision information acquisition portion 123 described later.

First, for each line, the process performs block matching processing to obtain a horizontal moving distance between frames. That is, when a horizontal moving distance of a line where a current frame is present (hereinafter refereed to as "current line") is obtained, an edge pixel of the current line is extracted on the basis of a difference in pixel values between target pixel and its adjacent pixel.

Then, the process performs matching operations on both a reference block B1 constituted of m number of pixels including edge pixels of this current line shown in FIG. 3B and a candidate block B2 constituted of m number of pixels in a search range Si constituted of s number of pixels set to a corresponding line (hereinafter referred to as "past line") of a past frame, which is a search range, shown in FIG. 3A. That is, the process obtains a difference in pixel values at mutually corresponding positions of the respective reference block B1 and candidate block B2 to perform processing such as accumulation of absolute values of the differences all over the blocks, thereby creating an evaluation value for the candidate block B2.

Then, such the evaluation values are created for all the candidate blocks B2 in the search range S1 to define a position of the candidate block B2 in which the evaluation value can be minimized as a position of the best matching candidate block B2. Thus, a moving distance corresponding to the reference block B1 is detected. In this case, if such a block that its pixels can each be shifted by one pixel is used as a candidate block in the search range S1, s number of candidate blocks are to be handled in total.

Next, based on space-directional and time-directional continuity of a horizontal moving distance of each of the lines obtained above, the process decides which lines in the current frame have a telop on them. In this case, if a telop is present on some lines, the same moving distance is obtained for a predetermined number of consecutive lines in a predetermined number of consecutive frames. Therefore, from such a decision of continuity, it is possible to decide which line in the current frame has an artificial image such as a telop.

Next, for a line decided to have a telop on it of those lines present in the current frame, the process outputs a horizontal moving distance obtained above as motion information ME. For the other lines, the process outputs moving distance 0 as motion information ME in place of the horizontal moving distance obtained above. That is, for the other lines, the process outputs no motion information essentially.

Further, the telop extraction circuit 110 has a counter corresponding to each pixel of a screen and the decision information acquisition portion 123 for obtaining as decision information a count value CN that is used to decide whether each pixel of the screen is that of an edge position of the telop finally. FIG. 4 shows a configuration of the decision information acquisition portion 123.

This decision information acquisition portion 123 has a motion compensation portion 141 for obtaining a signal Vap' by performing motion compensation on a signal Vap, which has been read out of the buffer memory 107 by one frame before an image signal Va is read out thereof, based on line-specific motion information ME output out of the motion information output portion 122. It also has a motion compensation portion 142 for obtaining a signal Van' by performing motion compensation on a signal Van, which read out of the buffer memory 107 by one frame after the image signal Va has been read out thereof, based on this motion information ME. By thus performing motion compensation, a horizontal position of the telop present on each of the screens obtained by the signals Vap' and Van', respectively coincides with a horizontal position of the telop present on a screen obtained by a signal Vac of the current frame.

Further, the decision information acquisition portion 123 has a decision portion 143 for detecting whether each of the pixels constituting a screen obtained by the signal Vac of a current frame is pixel corresponding to a telop. This decision portion 143 makes a decision using the signal Vac of the current frame, the signal Vap' of a frame, which is one frame before the current frame in timing, and the signal Van' of a frame, which is one frame after the current frame in timing.

For example, this decision is performed, as shown in FIG. 5, supposing to be c0 a pixel (target pixel) constituting a screen obtained by the signal Vac of the current frame to be decided and using pixel data of this pixel c0 and pixels c-1 and c1, which are before and after it, pixel data of one-frame anterior pixels p-1, p0, and p1, which correspond to the three pixels of the current frame respectively, and pixel data of one-frame posterior pixels n-1, n0, and n1, which correspond to the three pixels of the current frame.

If, in this case, a relationship between pixel values of the pixels c0, c-1, and c1 and those of the pixels p-1, p0, and p1 satisfies any one of patterns R1–R8 and L1–L8 shown in FIG. 6 and a relationship between pixel values of the pixels c0, c-1, and c1 and those of the pixels n-1, n0, and n1 satisfies any one of the patterns R1–R8 and L1–L8 shown in FIG. 6, it is decided that this target pixel c0 is a pixel of a position corresponding to the telop.

Here, it is supposed that there is one extreme value or less in the horizontal three pixels based on a signal band of the image signal Va. In this case, if a difference between pixel values of the pixels c0, c-1, and c1 and those of the pixels p-1, p0, and p1 and a difference between pixel values of the pixels c0, c-1, and c1 and those of the pixels n-1, n0, and n1 have occurred because differences not larger than a pixel have not been compensated by motion compensation processing, a magnitude relationship among these adjacent pixel values indicates any one of the patterns R1–R8 and L1–L8 shown in FIG. 6.

Therefore, if a magnitude relationship among the adjacent pixel values satisfies any one of the patterns R1–R8 and L1–L8 shown in FIG. 6, it is conceivable that a difference between the pixel values, if any, has occurred because differences not larger than the pixel have not been compensated by motion compensation. Therefore, if a magnitude relationship among the pixel values satisfies any one of the patterns R1–R8 and L1–L8 shown in FIG. 6, it is possible to decide that pixel values of the pixels c0, c-1, and c1 and those of the pixels p-1, p0, and p1 are essentially equal to each other, pixel values of the pixels c0, c-1, c1 and those of the pixels n-1, n0, and n1 are essentially equal to each other, and the target pixel c0 is a pixel of a position corresponding to the telop.

It is to be noted that, in FIG. 6, YL, Y, and YR represent pixel values of the pixels c-1, c0, c1 respectively, while YMCL, YMC, and YMCR represent pixel values of the pixels p-1, p0, and p1 or those of the pixels n-1, n0, n1. Relational expressions among the patterns R1–R8 and L1–L8 are as follows:

Pattern R1: $YL \leq YMCL \leq Y \leq YMC \leq YR$
Pattern R2: $YL \leq YMCL \leq Y \leq YMC \geq YR$
Pattern R3: $YL \leq YMCL \leq Y \geq YMC \geq YR$
Pattern R4: $YL \leq YMCL \geq Y \geq YMC \geq YR$
Pattern R5: $YL \geq YMCL \leq Y \leq YMC \leq YR$
Pattern R6: $YL \geq YMCL \geq Y \leq YMC \leq YR$
Pattern R7: $YL \geq YMCL \geq Y \geq YMC \leq YR$
Pattern R8: $YL \geq YMCL \geq Y \geq YMC \geq YR$
Pattern L1: $YL \leq YMC \leq Y \leq YMCR \leq YR$
Pattern L2: $YL \leq YMC \leq Y \leq YMCR \geq YR$
Pattern L3: $YL \leq YMC \leq Y \geq YMCR \geq YR$
Pattern L4: $YL \leq YMC \geq Y \geq YMCR \geq YR$
Pattern L5: $YL \geq YMC \leq Y \leq YMCR \leq YR$
Pattern L6: $YL \geq YMC \geq Y \leq YMCR \leq YR$
Pattern L7: $YL \geq YMC \geq Y \geq YMCR \leq YR$
Pattern L8: $YL \geq YMC \geq Y \geq YMCR \geq YR$ As described above, by making a decision using the patterns, it is possible to decide whether the target pixel c0 is a pixel of a position corresponding to a telop accurately even if there is a compensation residual difference not larger than a pixel caused by motion compensation performed at the motion compensation portions 141 and 142. That is, if a difference between pixel values is obtained in decision making, a compensation residual difference not larger than a pixel has a significant influence on a decision result; however, if a pattern is used in decision making as described above, a compensation residual difference has no influence on the decision result.

Further, the decision information acquisition portion 123 has an edge decision portion 144 for detecting whether each of the pixels constituting a screen obtained by the signal Vac of a current frame is a pixel of an edge position of an image. The edge decision portion 144 makes a decision using the signal Vac of the current frame.

That is, supposing that a pixel (target pixel) constituting a screen obtained by the signal Vac of the current frame to be decided is c0, for example, as shown in FIG. 7, this decision is performed using pixel data of this pixel c0 and its anterior and posterior pixels c-1 and c1, pixel data of pixel a0 in a line by one line before the current line, which pixel a0 corresponds to the target pixel c0 of this current frame, and pixel data of pixel b0 in a line by one line after the current line, which pixel b0 corresponds to the target pixel c0 of this current frame.

In this case, first the edge decision portion 144 decides whether the target pixel c0 is present at a horizontal edge position. Supposing that pixel values of the pixels c0, c-1, and c1 are Ec0, Ec-1, and Ec1 respectively and pixel values of the pixels a0 and b0 are Ea0 and Eb0 respectively, if any one of the inequalities, |Ec-1-Ec0|>HEG, |Ec-1-Ec1|>HEG, and |Ec0-Ec1|>HEG is satisfied, the process decides that the target pixel c0 is present at a horizontal edge position. It is to be noted that HEG is a predetermined threshold value. When the target pixel c0 is decided to be present at a horizontal edge position, the process decides that the target pixel c0 is present at an edge position without determining a vertical edge position and sets to 1 a flag, E-flag indicating whether the target pixel c0 is present at an edge position.

If the target pixel c0 is decided not to be present at a horizontal edge position, on the other hand, next the process decides whether the target pixel c0 is present at a vertical edge position. If any one of the inequalities, |Ea0-Ec0|>VEG, |Ea0-Eb0|>VEG, and |Ec0-Eb0|>VEG is satisfied, the process decides that the target pixel c0 is present at a vertical edge position. It is to be noted that VEG is a predetermined threshold value. When the target pixel c0 is decided to be present at a vertical edge position, the process decides that the target pixel c0 is present at an edge position and sets the flag, E-flag to 1. If the target pixel c0 is decided not to be present at a vertical edge position, on the other hand, the process sets the flag, E-flag to 0.

A decision output of this edge decision portion 144, that is, E-flag is supplied to the above-mentioned decision portion 143. As described above, the decision portion 143 decides whether the target pixel c0 is present at a position corresponding to a telop by performing pattern decision, to obtain a positive result or a negative result. However, this decision is performed only in a case where the target pixel c0 is present at an edge position, so that if E-flag indicates that the target pixel is not present at an edge position, the process obtains a negative result immediately without performing the above-mentioned pattern decision.

Further, the decision information acquisition portion 123 has a counter portion 145 including a counter that corresponds to each pixel of a screen. The above-mentioned decision portion 143 updates a count value of the counter which is present at the counter portion 145 and corresponds to a target pixel c0 in accordance with the above-mentioned positive or negative result for this target pixel c0. In this case, if a positive result is given, the process performs increment processing of increasing a pre-update count value by one to update it with a post-processing count value. However, a maximum value of the count value is set to eight, for example. If a negative result is given, on the other hand, the process performs decrement processing on the pre-update count value to update it with a post-processing count value. In this case, for example, if the pre-update count value is eight, the process sets a count value to six and, otherwise, it sets the count value to 0.

In this case, a relationship will be described between a counter which is present in the counter portion 145 and corresponds to a target pixel c0 and a counter in which a pre-update count value is held. The counter portion 145, as shown in FIG., 8, has a counter CT which corresponds to each of the horizontal and vertical pixels which constitute one screen (one frame). It is to be noted that in contrast to a counter CT0 corresponding to the target pixel c0, a counter CTP holding a pre-update count value corresponds to a pixel when an image on the target pixel c0 has been present one frame before.

Therefore, to update a count value of the counter CT0 corresponding to the target pixel c0, it is necessary to obtain a pre-update count value from the counter CTP. To do so, the counter portion 145 is supplied with motion information ME for each line output from the motion information output portion 122 (see FIG. 2), so that based on this information, the counter CTP is identified. An arrow in FIG. 8 indicates a motion direction.

Figure 9:
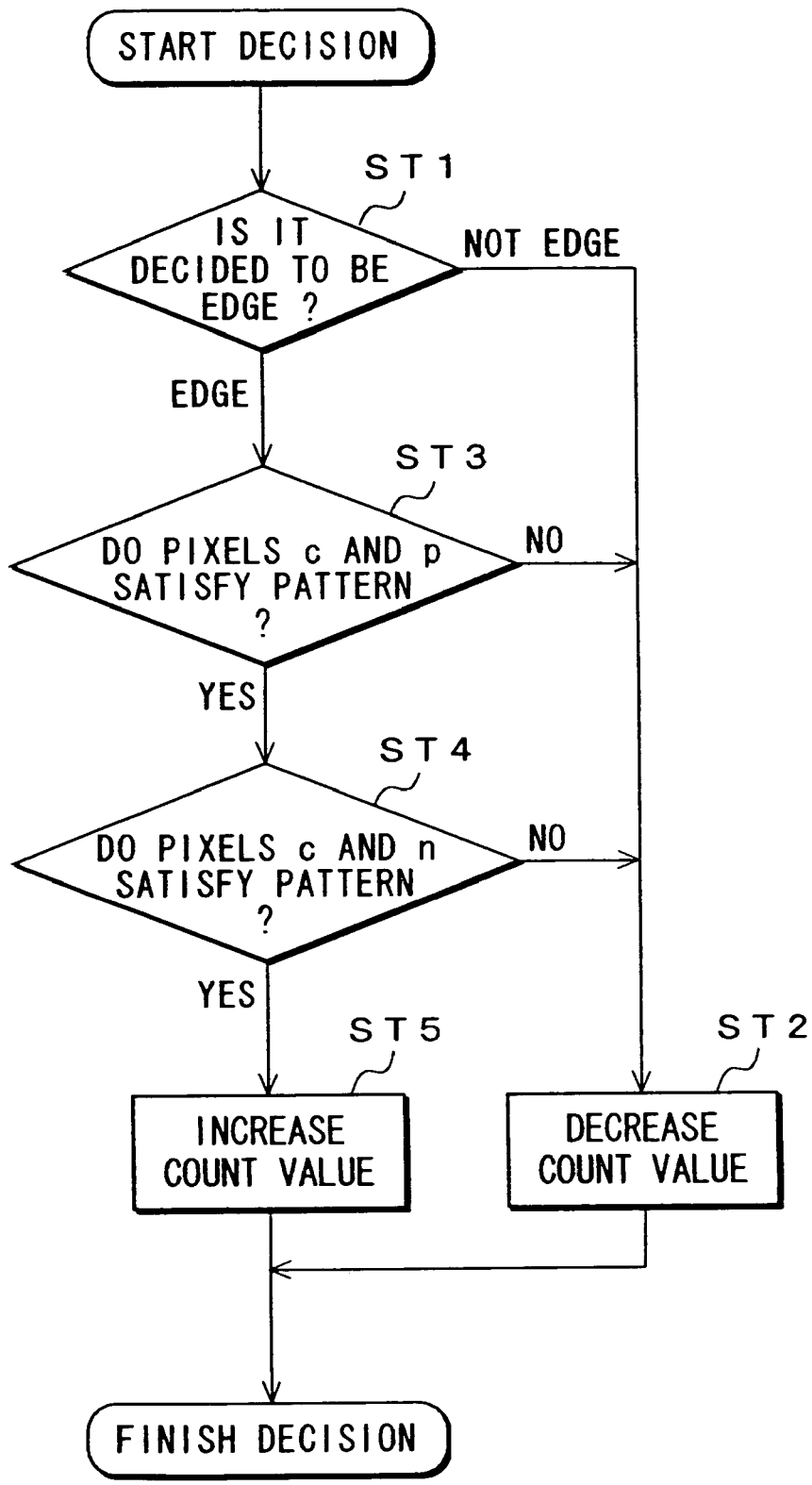
FIG. 9 is a flowchart for showing decision processing on whether target pixel is present at an edge position.

A flowchart of FIG. 9 shows decision processing which the above-mentioned decision portion 143 performs on a target pixel c0.

First, at step ST1, the process decides whether the target pixel c0 is present at an edge position. This decision is performed on the basis of a decision output of the edge decision portion 144, that is, E-flag. If the target pixel c0 is not present at an edge position, the process goes to step ST2 immediately to update a count value of a counter which is present at the counter portion 145 and corresponds to this target pixel c0 with a count value on which the above-mentioned decrement processing has been performed. The process then finishes.

Further, if the target pixel c0 is at the edge position at step ST1, the process goes to step ST3 to decide whether a relationship between pixel values of pixels c0, c-1, and c1 and pixel values of the pixels p-1, p0, and p1 satisfies any of the patterns R1–R8 and L1–L8 shown in FIG. 6. If the relationship satisfies none of them, the process goes to step ST2 to update a count value of the counter which is present at the counter portion 145 and corresponds to this target pixel c0 with a count value on which the above-mentioned decrement processing has been performed. The process then finishes. If it satisfies any of them, on the other hand, the process goes to step ST4.

At step ST4, the process decides whether a relationship between the pixel values of the pixels c0, c-1, and c1 and the pixels n-1, n0, and n1 satisfies any of the patterns R1–R8 and L1–L8 shown in FIG. 6. If it satisfies none of them, the process goes to step ST2 to update a count value of the counter which is present at the counter portion 145 and corresponds to this target pixel c0 with a count value on which the above-mentioned decrement processing has been performed. The process then finishes. If it satisfies any of them, on the other hand, the process goes to step ST5 to update a count value of the counter which is present at the counter portion 145 and corresponds to this target pixel c0 with a count value on which the above-mentioned increment processing has been performed. The process then finishes.

Referring back to FIG. 2, the telop extraction circuit 110 has a binarizing processing portion 124 for binarizing a count value CN of the counter which is present at the counter portion 145 of the decision information acquisition portion 123 and corresponds to each pixel of a screen using a predetermined threshold value TH, for example, 3 to obtain an edge position flag EFL indicating whether each pixel of a screen obtained by a signal component of a current frame of the image signal Va is a pixel of an edge position of a telop. The edge position flag EFL, which corresponds to each pixel of a screen obtained by the binarizing processing portion 124, is temporarily stored in a memory in the binarizing processing portion 124 not shown and used in processing of an edge pixel extraction portion 125, which will be described later.

The edge position flag EFL, which is obtained corresponding to each pixel of a screen in this binarizing processing portion 124, provides a final decision result indicating whether each of the pixels of the screen is a pixel of an edge of a telop. That is, the above-mentioned decision information acquisition portion 123 and this binarizing processing portion 124 constitute detecting unit for detecting whether each of the pixels of the screen obtained by a signal component of a current frame is a pixel of an edge position of a telop.

Figure 10:
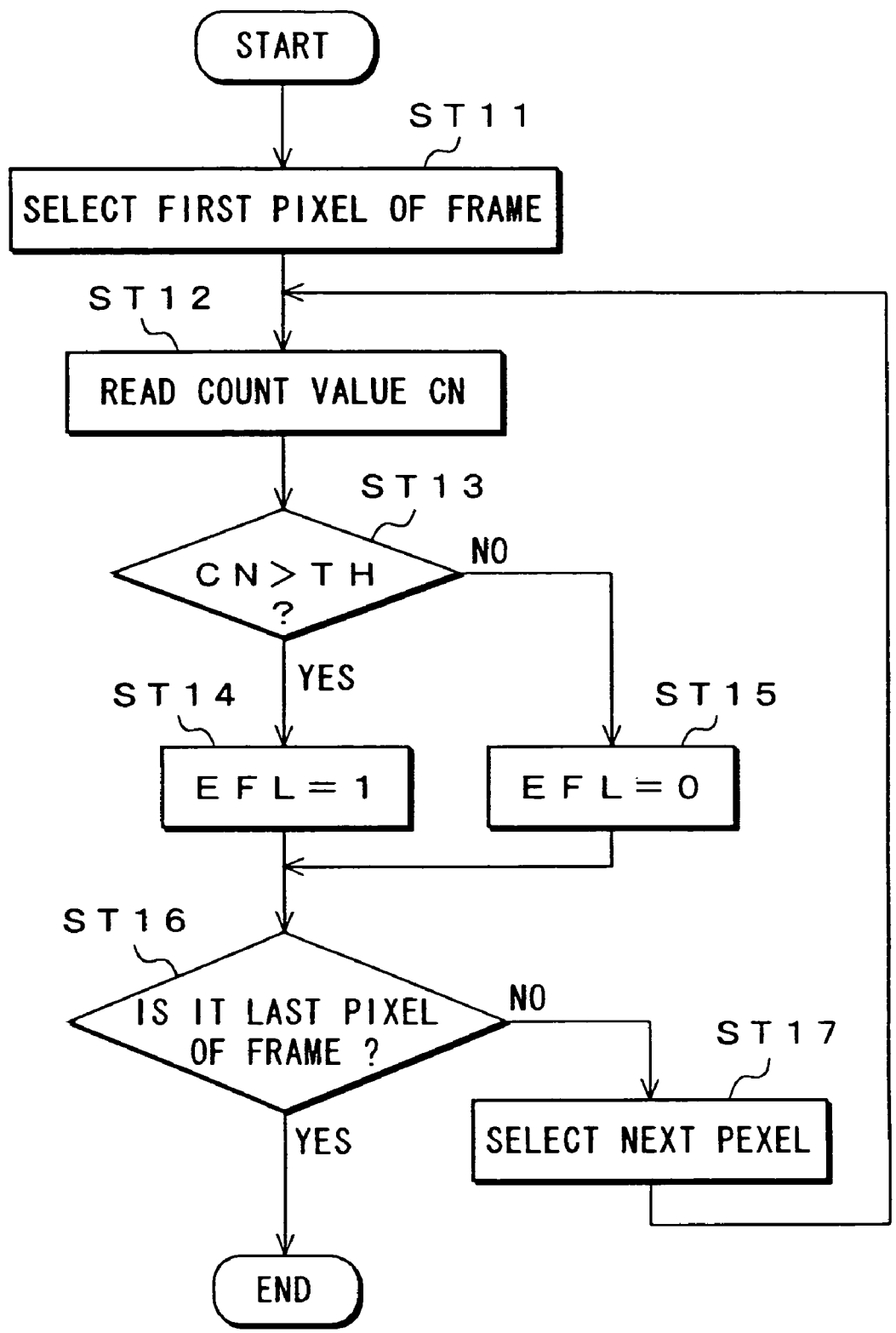
FIG. 10 is a flowchart for showing binarization processing for the purpose of obtaining an edge position flag.

A flowchart of FIG. 10 shows binarizing processing performed by the binarizing processing portion 124.

First, at step ST11, a first pixel of a frame is selected. Then, the process reads a count value CN of a counter, which corresponds to the selected pixel at step ST12.

Next, at step ST13, the process decides whether the read count value CN is larger than a threshold value TH. If CN>TH, the process sets the edge position flag EFL to 1 at step ST14 and goes to step ST16. If CN is not larger than TH, on the other hand, the process sets the edge position flag EEL to 0 at step ST15 and goes to step ST16.

At step ST16, the process decides whether a selected pixel is the last pixel of the current frame. If it is not the last pixel, the process selects a next pixel at step ST17 and returns to step ST12 to perform the same processing described above. If it is the last pixel on the other hand, it finishes the processing.

Further, referring back to FIG. 2, the telop extraction circuit 110 has the edge pixel extraction portion 125 for extracting pixel data which corresponds to a pixel of an edge position of a telop from the items of pixel data which constitute a signal component of a current frame of the image signal Va, based on the edge position flag EEL obtained by the binarizing processing portion 124.

At this edge extraction portion 125, such a pixel that EFL is set to 1 among the pixels obtained by a signal component of a current frame of the image signal Va is assigned pixel data of this pixel as it is as pixel data (Y, U, V). Such a pixel data that EFL is set to 0 is assigned (0, 0, 0) as pixel data (Y, U, V). Thus, at the edge pixel extraction portion 125, only pixel data corresponding to a pixel of an edge position of a telop essentially is extracted.

In such a manner, pixel data corresponding to each pixel of a screen assigned by the edge pixel extraction portion 125 is temporarily stored in the memory in the edge pixel extraction portion 125, not shown. The pixel data is used in processing by the histogram-processing portion 126, which will be described later.

Figure 11A:
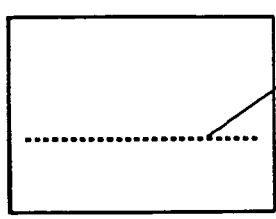
FIGS. 11A–11C are illustrations each for showing one example of assigning processing at an edge pixel extraction portion.
Figure 11B:
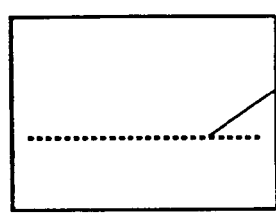
Figure 11C:
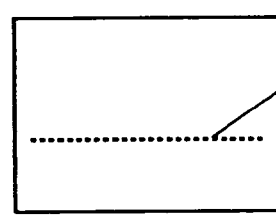

FIG. 11 shows one example of assigning processing at an edge pixel extraction portion 125. Further, it is assumed that an edge position flag EEL corresponding to a pixel of a certain line is such as shown in 11B and a value of input luminance data Y corresponding to the pixel of that line is such as shown in FIG. 11A. In this case, as shown in FIG. 11C, at such a pixel that EFL=1, the luminance data Y is assumed to be equal to input luminance data Y and, at such a pixel that EFL=0, the assigned luminance data Y is 0. It is to be noted that although FIGS. 11A–11C show only processing of luminance data Y, the same processing is performed also for color difference data pieces U and V.

Figure 12:
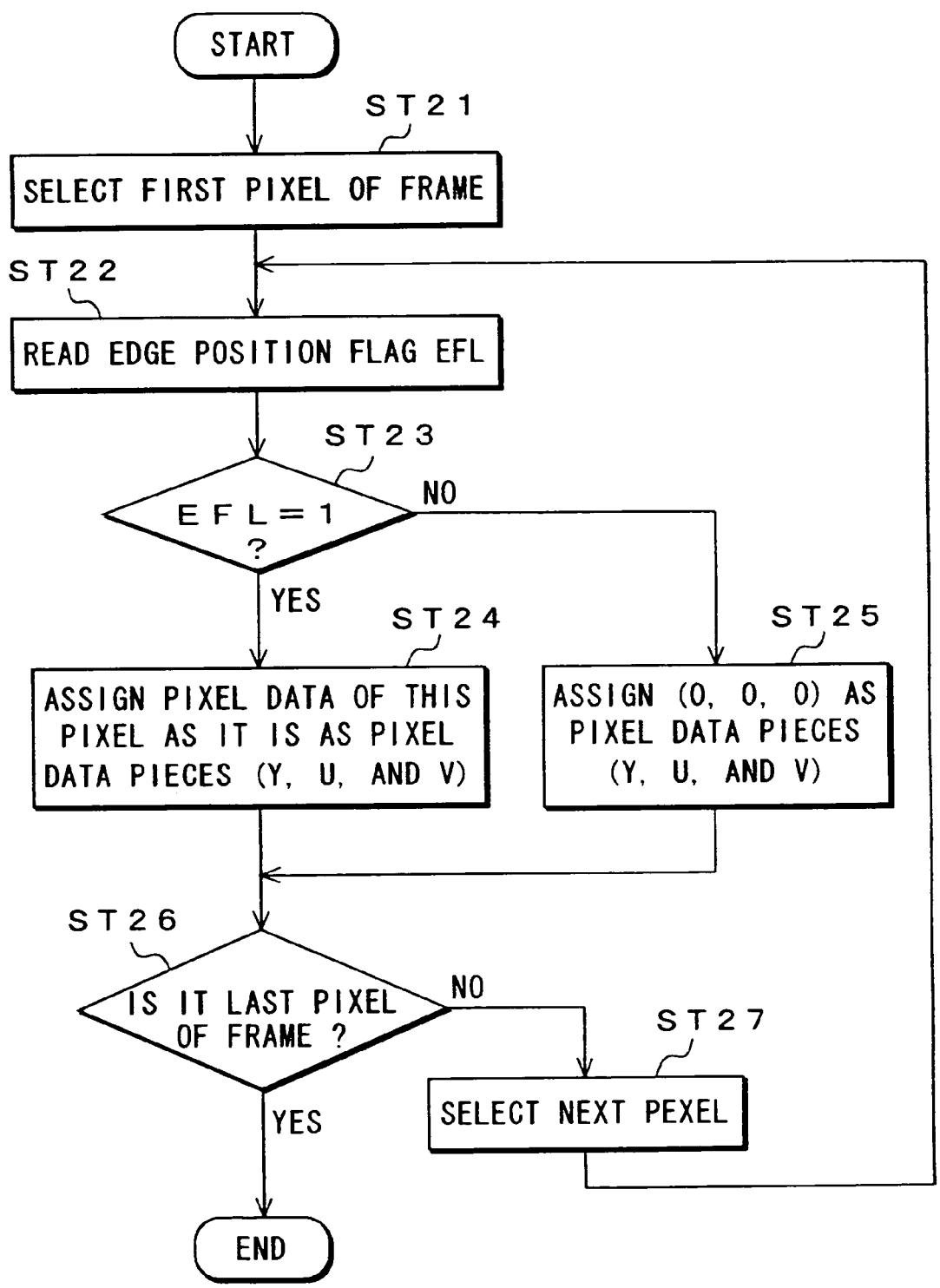
FIG. 12 is a flowchart for showing assigning processing performed at the edge pixel extraction portion.

A flowchart of FIG. 12 shows assigning processing performed at the edge pixel extraction portion 125.

First, at step ST21, a first pixel of a frame is selected. At step ST22, the process reads an edge position flag EFL, which corresponds to the selected pixel.

Next, at step ST23, the process decides whether EFL is 1. If EFL=1, the process assigns pixel data of this pixel as it is as pixel data (Y, U, V) at step ST24 and goes to step ST26. If EFL=0, on the other hand, the process assigns (0, 0, 0) as pixel data (Y, U, V) at step ST25 and goes to step ST26.

At step ST26, the process decides whether a selected pixel is the last pixel of the current frame. If it is not the last pixel, the process selects a next pixel at STEP 27 and returns to step ST22 to perform the same processing as above. If it is the last pixel, the process finishes the processing.

Referring to FIG. 2 again, the telop extraction circuit 110 has a histogram-processing portion 126 for creating a histogram using pixel data that corresponds to a pixel of an edge position of a telop extracted by the edge pixel extraction portion 125. Based on this histogram, the histogram-processing portion 126 obtains a value yr of luminance data Y, a value ur of blue color difference data U, and a value vr of red color difference data V, which constitute pixel data corresponding to the telop, from each of the items of data, Y, U and V.

FIG. 13 shows a configuration of the histogram-processing portion 126.

This histogram-processing portion 126 has a histogram creation portion 151 for creating a histogram using as a material pixel data (Y, U, V) that corresponds to a pixel of an edge position of a telop extracted by the edge pixel extraction portion 125. At this histogram creation portion 151, a histogram is created for each of the luminance data Y, the blue color difference data U, and the red color difference data V.

In this case, the pixel data (Y, U, V) as a variable is sub-divided into any classes for each data value to create a histogram having the number of items of the data belonging to each of the classes as a frequency. For example, in a case where the luminance data Y is 8-bit data and so can take on 0 through 255 as data values, the luminance data Y is sub-divided into 256 classes for each data value to create the histogram thereof having the number of items of the data belonging to each of the classes as a frequency. Histograms of the color difference data U and V are also created similarly.

This histogram is created using pixel data (Y, U, V) that corresponds to a pixel of an edge position of a telop. Therefore, in respective histograms of each of the items of data Y, U, and V, a data value having maximum frequency corresponds to data value of each of the items of data Y, U, and V, which constitute pixel data which corresponds to the telop.

Figure 14A:
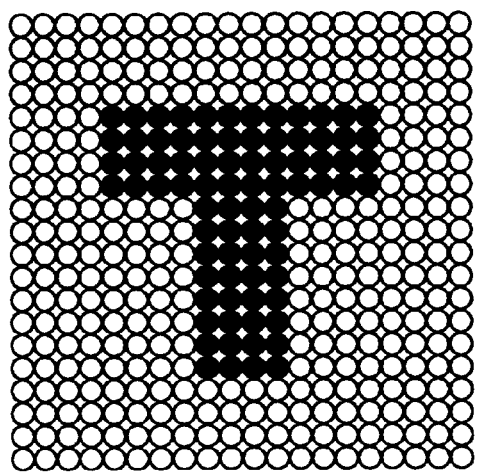
FIGS. 14A–14C are illustrations each for showing creation of a histogram.
Figure 14B:
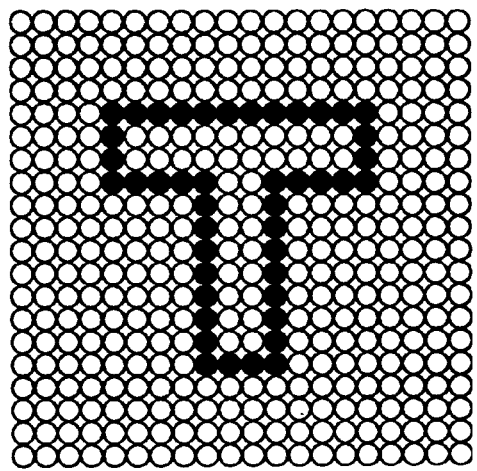
Figure 14C:
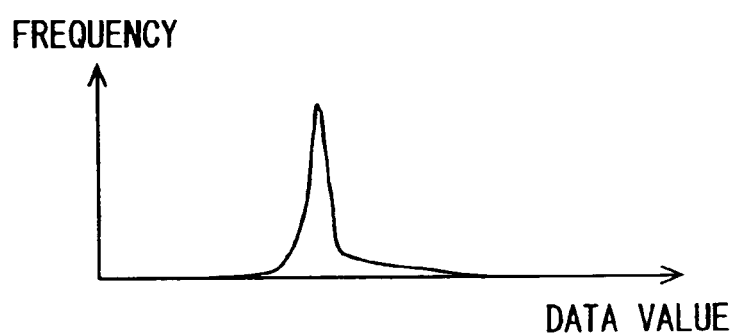

FIG. 14A shows a part of pixel data constituting the image signal Va, in which a symbol of "•" indicates pixel data corresponding to a telop and a symbol of " indicates the other pixel data. In this case, the edge pixel extraction portion 125 extracts only pixel data corresponding to a pixel of an edge position of a telop indicated by the symbol of " in FIG. 14B. Therefore, a histogram has such a shape as shown in FIG. 14C.

It is to be noted that pixel data (Y, U, V) corresponding to a pixel of an edge position of a telop has its own data values that fluctuate and are not constant due to effects of noise and the like actually. Therefore, it is impossible to use only such a data value having the maximum frequency as data value of the pixel data (Y, U, V) corresponding to the telop. That is, data values of the pixel data (Y, U, V) corresponding to this telop needs to be obtained within a predetermined width.

Therefore, according to the present embodiment, data value as a variable is sub-divided into a predetermined number of classes to create a histogram having the number of items of the data belonging to each of the classes as a frequency. Data values corresponding to a class having the maximum frequency in a relevant histogram are used as data values of the pixel data (Y, U, V) corresponding to a telop. To determine a width of this class and a range of data values of each of the classes, a histogram created by the histogram creation portion 151 is used.

Referring back to FIG. 13, the histogram-processing portion 126 has a mode value/variance value acquisition portion 152 for acquiring mode value (data value having the maximum frequency) ym, um, and vm and variance value yd, ud, and vd respectively from a histogram of each of the items of data Y, U, and V created at the histogram creation portion 151. It is to be noted that the variance value yd, ud, and vd is a value obtained by, for example, rounding up a fraction of a variance a 2 obtained by following Expression (1).

$$\sigma^2 = \frac{1}{N} \sum_{i=1}^{n} (xi - \bar{x})^2 fi \quad (1)$$

In the Expression (1), n is the number of variables (data values), xi is a variable, x bar is an average value, fi is a frequency of the variable xi, and N is a total of the frequencies.

Further, the histogram-processing portion 126 has a class determination portion 153 for determining a class of a histogram for each of the items of data Y, U, and V based on mode values ym, um, and vm and variance values yd, ud, and vd, which have been obtained at the acquisition portion 152. This class determination portion 153 determines a width of a class of a histogram and a range of data values for each class as follows.

Figure 15:
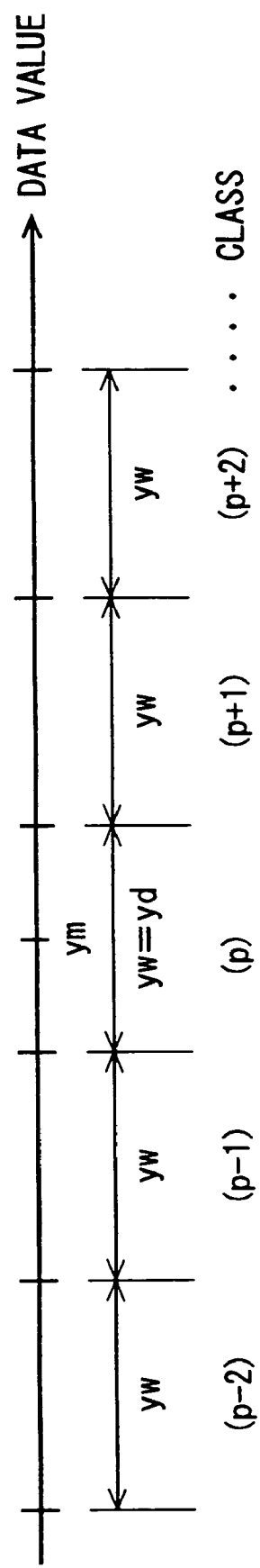
FIG. 15 is an illustration for explaining a class width and a range of a data value for each class which are determined by a class determination portion.

For luminance data Y, it is determined as shown in FIG. 15. That is, a width yw of a class is determined to a variance value yd.

Further, as for a range of data values of each class, first a range of data values of a class p is determined so that a mode value ym comes roughly to a midpoint. In this case, the range of the data values of the class p is determined to ym−(yd/2−1) through ym+yd/2 or ym−yd/2 through ym+(yd/2−1) if the variance value yd is an even number and, if it is an odd number, to ym−(yd−1)/2 through ym+(yd−1)/2.

Next, ranges of data values of classes p−1, p−2, ... which are positioned before this class p and classes p+1, p+2, ... which are positioned after the class p are sequentially determined so that they have the above-mentioned class's width yw. It is to be noted that in the last class positioned before the class p and the last class positioned after the class p, their width becomes a value of yw or less than that.

Further, for color difference data, U and V, a width of a class of a histogram and a range of data values of each class are determined as in the case of the above-mentioned luminance data Y.

Although it has been described that a range of data values of the class p is determined so that a mode value ym comes roughly to a midpoint, the range of the data values of this class p may be determined so that an average value comes roughly to the midpoint.

Referring back to FIG. 13, the histogram-processing portion 126 has a histogram creation portion 154 for creating a histogram for each of the items of the data Y, U, and V based on a class of a histogram determined by the class determination portion 153. In this case, a frequency of each class is obtained by adding together frequencies of multiple data values, which correspond to a range of data values of each class, as referencing histograms of each of the items of data Y, U, and V created by the histogram creation portion 151.

Further, the histogram-processing portion 126 has a data value determination portion 155 for determining data values (having a class width) corresponding to such a class that has the maximum frequency for each of the histograms for each of the items of data Y, U, and V created by the histogram creation portion 154 as data values yr, ur, and vr of the items of data Y, U, and V, which constitute pixel data corresponding to a telop.

The following will describe operations of the histogram-processing portion 126 shown in FIG. 13.

Pixel data (Y, U, V) corresponding to a pixel of an edge position of a telop extracted at the edge pixel extraction portion 125 is read from the memory in this edge pixel extraction portion 125 and supplied to the histogram creation portion 151. At this histogram creation portion 151, the pixel data (Y, U, V) corresponding to a pixel of the edge position of this telop are used as a material to create a histogram for each of the items of the data Y, U, and V.

At the mode value/variance value acquisition portion 152, the mode values ym, um, and vm and the variance values yd, ud, and vd from the histogram of each of the items of data Y, U, and V created at the histogram creation portion 151 are obtained. The variance values ym, um, and vm are obtained as integral values by performing, for example, rounding off a fraction of a calculation result $\sigma^2$ based on the above-mentioned Expression (1).

At the class decision portion 153, a class (a class width and a range of data values of each class) of a histogram is determined for each of the items of data Y, U, and V based on the mode values ym, um, and vm and the variance values yd, ud, and vd, which has been obtained at the mode value/variance value acquisition portion 152.

Further, at the histogram creation portion 154, for each of the items of the data Y, U, and V, a histogram having the number of items of data belonging to each class as a frequency is created on the basis of the class of the histogram determined at the class decision portion 153. In this case, as described above, the frequency of each class is obtained by adding together frequencies of multiple items of data which correspond to a range of data values of each class as referencing the histogram of each item of the data Y, U, and V created at the histogram creation portion 151.

Then, at the data value determination portion 155, data values (having a class width) that correspond to a class having the maximum frequency for the histogram of each of the items of data Y, U, and V created at the histogram creation portion 154 is determined as data values yr, ur, and vr of the items of data Y, U, and V constituting pixel data that corresponds to the telop. These data values yr, ur, and vr are temporarily stored in the memory, not shown, in the data value determination portion 155 and used in processing of an extraction portion 128 (see FIG. 2), which will be described later.

At the histogram-processing portion 126 shown in FIG. 13, a histogram (one-dimensional histogram) is created for each of the items of data Y, U, and V, so that based on each of the histograms, data values yr, ur, and vr of the items of data Y, U, and V constituting pixel data that corresponds to the telop are determined.

According to the invention, in this case, in comparison to a case where a histogram (three-dimensional histogram) for the items of data Y, U, and V as a whole, a hardware scale can be reduced greatly. According to the invention, only pixel data (Y, U, V) corresponding to a pixel of an edge position of a telop is used as a material, so that a result of using a one-dimensional histogram is almost the same as that obtained by using a three-dimensional histogram.

It is supposed here that a hardware scale is roughly estimated for each of the cases of creating a three-dimensional histogram and of creating a one-dimensional histogram. In such a case, it is supposed that a data value takes on a value of 0 through 255, so that a class width is 8; therefore, calculations are performed in a condition where the number of classes is supposed to be 32. A hardware scale in the case of creating a three-dimensional histogram is 32×32×32×18=589824 (bits). In the case of creating a one-dimensional histogram, it is 3×32×18=1728 (bits). Here, "18 bits" indicates a data size for each class. Therefore, in the case of creating a one-dimensional histogram, the hardware scale can be reduced greatly as compared to the case of creating a three-dimensional histogram.

Further, at the histogram-processing portion 126 shown in FIG. 13, a width of a class in a histogram in each of the items of data Y, U, and V is determined on the basis of variance values yd, ud, and vd of the respective items of data Y, U, and V. Accordingly, even if there are fluctuations in data values of the items of data Y, U, and V which constitute pixel data corresponding to a pixel of an edge position of a telop, it is possible to obtain data values of the items of data Y, U, and V that constitute the pixel data corresponding to the telop properly.

Figure 16:
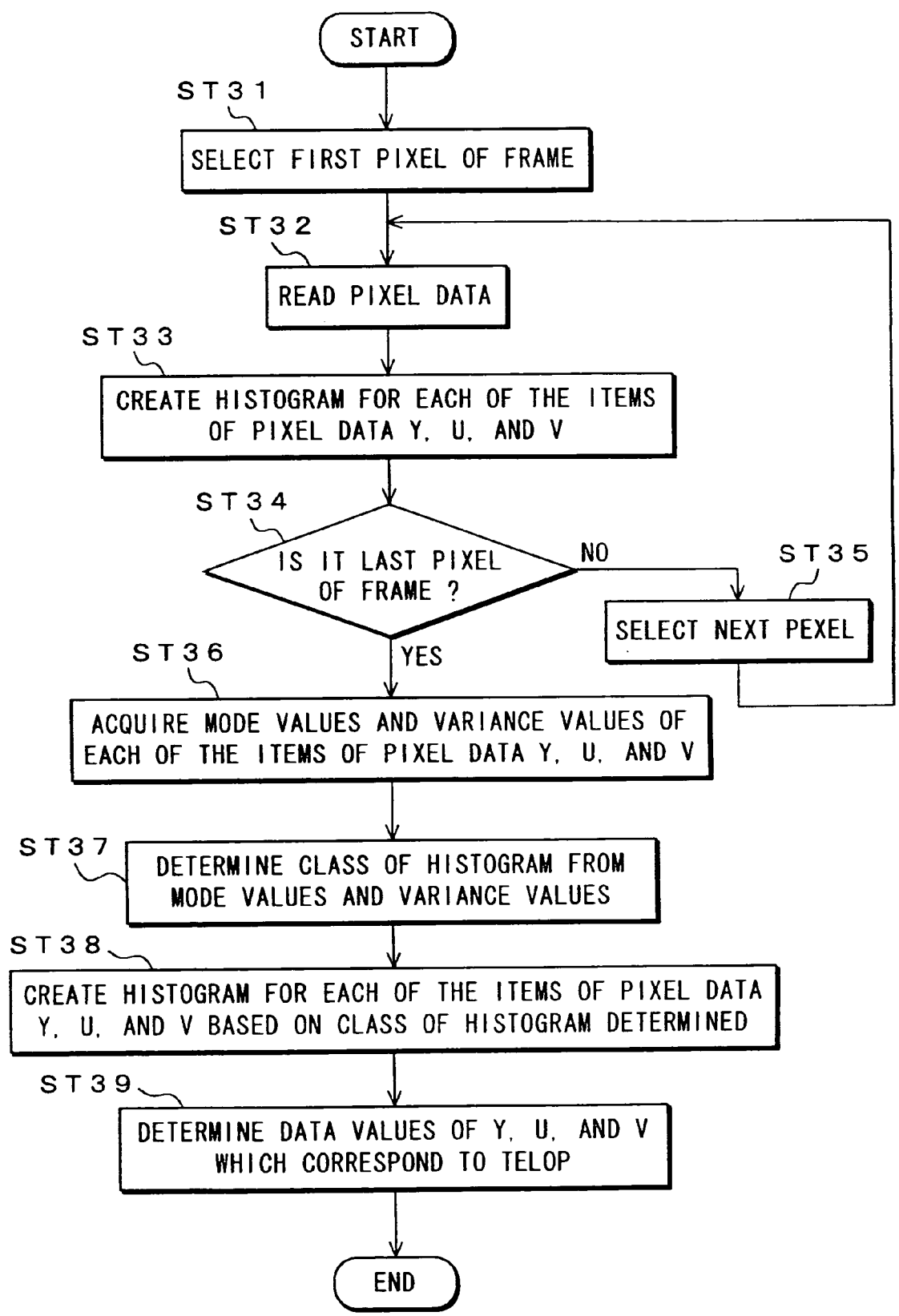
FIG. 16 is a flowchart for showing data-value determination processing at the histogram-processing portion.

A flowchart of FIG. 16 indicates data value determination processing which is performed at the histogram-processing portion 126.

First, at step ST31, a first pixel of a frame is selected. Then, at step ST32, the process reads pixel data (Y, U, V) corresponding to the selected pixel from pixel data of each pixel of a screen assigned at the edge pixel extraction portion 125.

Next, at step ST33, using the read pixel data (Y, U, V) as a material, a histogram is created for each of the items of data Y, U, and V. In this case, if the items of pixel data Y, U, and V are (0, 0, 0), that is, if they are not pixel data corresponding to a pixel of an edge position of a telop, a histogram creation processing using these pixel data (Y, U, v) as a material is not performed.

Next, at step ST34, the process decides whether the selected pixel is the last pixel of the frame. If it is not the last pixel, the process selects a next pixel at step ST35 and then returns to step ST32 to performs the same processing as described above. If it is the last pixel, the process goes to step ST36.

At step ST36, from histograms of the items of data Y, U, and V created at step ST33, the mode values ym, um, and vm and the variance values yd, ud, and vd are obtained. Then, at step ST37, based on the mode values ym, um, and vm and the variance values yd, ud, and vd obtained at step ST36, a class (a class width and a range of data values for each class) of a histogram is determined for each of the items of data Y, U, and V.

Next, at step ST38, based on the classes of the histograms determined at step ST37, for each of the items of data Y, U, and V, a histogram having the number of the items of data belonging to each class as a frequency is created. In this case, a frequency of each class is obtained by adding together frequencies of multiple data values which correspond to a range of data values of each class as referencing the histograms of the items of data Y, U, and V created at step ST33.

Next, at step ST39, the process determines data values yr, ur, and vr of the items of data Y, U, and V which correspond to the telop. In this case, it is supposed that data values (having a class width) that correspond to such a class that has the maximum frequency for the histogram of each of the items of data Y, U, and V created at step ST38 are data values yr, ur, and vr of the items of data Y, U, and V, which constitute a pixel data corresponding to the telop.

Referring back to FIG. 2, the telop extraction circuit 110 has an extraction region selection portion 127 for selecting a region from which pixel data corresponding to a telop is extracted based on a count value CN of a counter which is present in the counter portion 145 (see FIG. 4) of the decision information acquisition portion 123 and corresponds to each pixel of a screen.

If at least one of count values CN corresponding to each of pixels that constitute each of the lines of a screen is one or larger, the extraction region selection portion 127 selects this line as an extraction region and sets an extraction region flag GFL which corresponds to each pixel of the line to one state, for example, 1. It is to be noted that the extraction region flag GFL which corresponds to each pixel of a line not selected as an extraction region is set to the other state, for example, 0.

In this case, since a region in which pixel data corresponding to a telop needs to contain the entire telop, the entire line including pixels (having a count value CN of 1 or larger) which are expected to be the telop pixels, even if a little, is to be selected as an extraction region.

Thus, an extraction region flag GFL corresponding to each pixel of a screen obtained at the extraction region selection portion 127 is temporarily stored in the memory in the extraction region selection portion 127 not shown and used in processing of the extraction portion 128, which will be described later.

FIGS. 17A and 17B show one example of selection processing of an extraction region performed by the extraction region selection portion 127. If a count value CN corresponding to each of the pixels of the screen is such as shown in FIG. 17A, the extraction region flag GFL corresponding to each of the pixels of the screen becomes such as shown in FIG. 17B.

Figure 18:
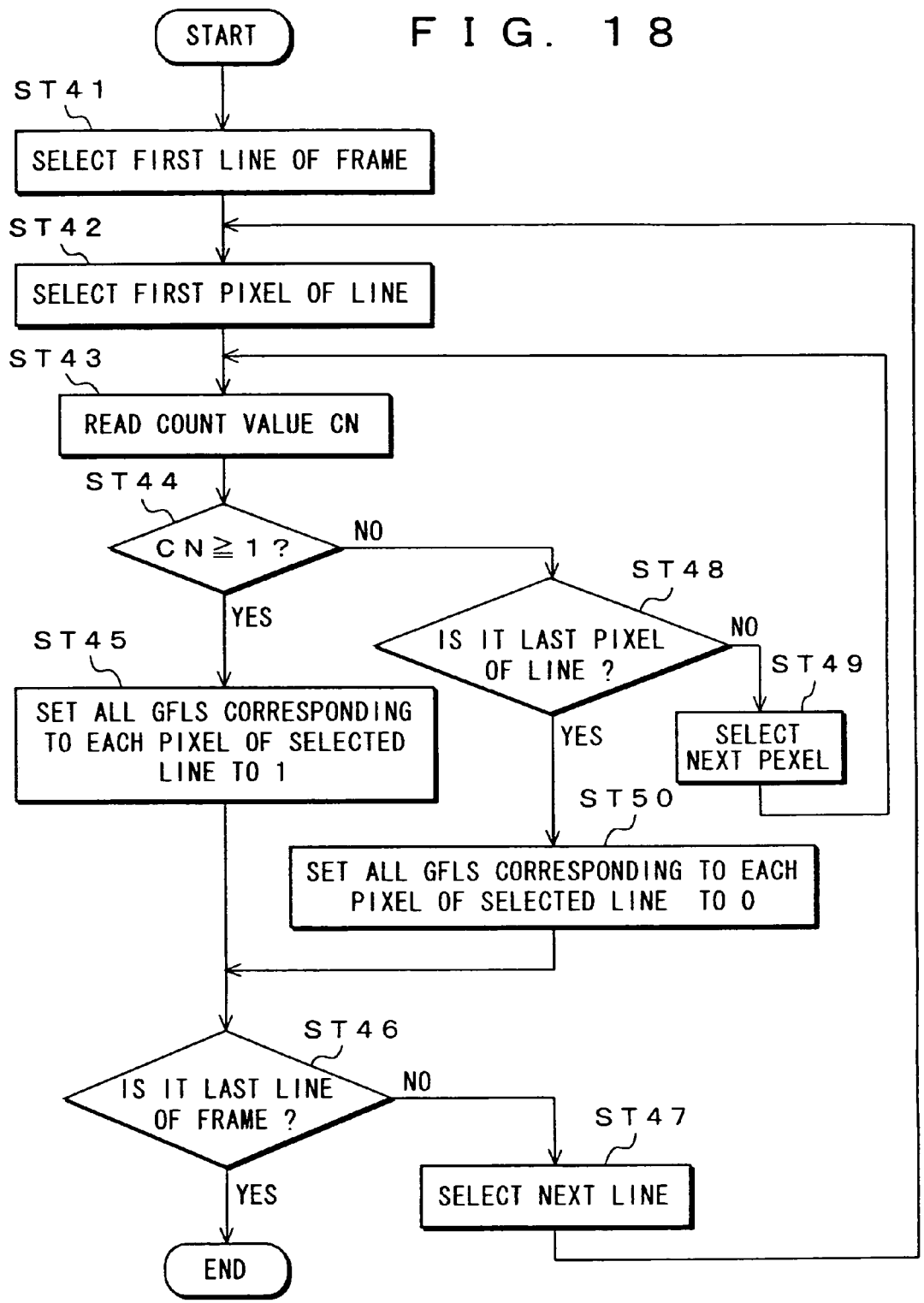
FIG. 18 is a flowchart for showing selection processing at the extraction region selection portion.

A flowchart of FIG. 18 shows selection processing performed by the extraction region selection portion 127. First, at step ST41 the process selects a first line of a frame and, at step ST42, selects a first pixel of the selected line. Then, the process goes to step ST43 to read a count value CN of a counter corresponding to the selected pixel.

Next, at step ST44, the process decides whether the read count value CN is larger than 1. If CN≧1, the process selects the selected line as an extraction region to set all the GFLs corresponding to each pixel of the line to 1 at step ST45 and goes to step ST46.

At step ST46, the process decides whether the selected line is the last line of the frame. If it is not the last line, the process selects a next line at step ST47 and returns to step ST42 to perform the same processing as above. If the selected line is the last line, on the other hand, the process finishes.

Further, if not CN≧1, that is, CN=0 at the above-mentioned step ST44, the process decides whether it is the last pixel of the selected line at step ST48. If it is not the last pixel, the process selects a next pixel at step ST49 and returns to step ST43 to perform the same processing as above. If it is the last pixel, the process does not select the selected line as an extraction region and sets all the GFLs corresponding to the pixels of the line to 0 at step ST50 and goes to step ST46 to perform the same processing as the above.

Referring back to FIG. 2 again, the telop extraction circuit 110 has the extraction portion 128 for extracting pixel data (Y, U, V) corresponding to the telop among items of pixel data that constitute a signal component of a current frame of the image signal Va based on the data values yr, ur, and vr determined at the histogram-processing portion 126 and the extraction region flag GFL obtained at the extraction region selection portion 127. The telop extraction circuit 110 has an output terminal 129 for outputting the pixel data (Y, U, V) extracted at this extraction portion 128 as extraction pixel data for the telop extraction circuit 110.

The extraction portion 128 extracts pixel data of the pixel such that its extraction region flag GEL becomes 1 and the pixel data (Y, U, V) is contained in a range of the data values yr, ur, and vr from the pixel data that constitutes a signal component of the current frame of the image signal Va.

Among the pixels of a screen obtained by a signal component of a current frame of the image signal Va, this extraction portion 128 assigns such pixels that GFL=1 and values of the data (Y, U, V) are contained in a range of the data values yr, ur, and vr to pixel data of this pixel as it is and the other pixels to (0, 0, 0) as the pixel data (Y, U, V). Accordingly, at the extraction portion 128, essentially only pixel data corresponding to the telop is extracted.

In such a manner, the pixel data (Y, U, V) corresponding to each pixel of a screen assigned at the extraction portion 128 is temporarily stored in the memory, not shown, in the extraction portion 128. The pixel data (Y, U, V) thus stored in the memory is then read as desired and derived to the output terminal 129.

Figure 19:
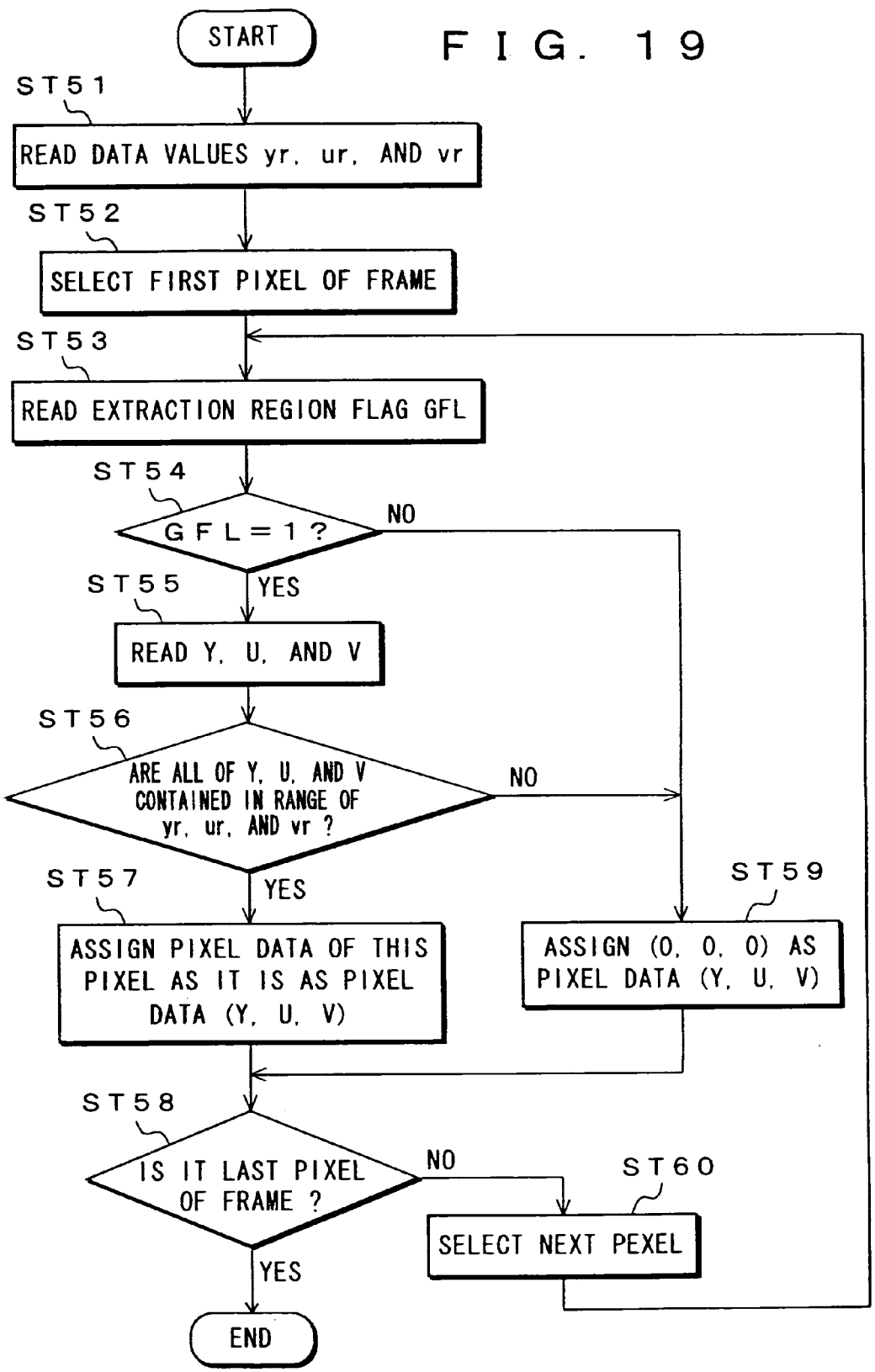
FIG. 19 is a flowchart for showing assigning processing at an extraction portion.

A flowchart of FIG. 19 shows assigning processing performed by the extraction portion 128.

First, at step ST51, the process reads data values yr, ur, and vr. At step ST52, the process selects a first pixel of a frame. Furthermore, at step ST53, the process reads an extraction region flag GFL corresponding to the selected pixel.

Next, at step ST54, the process decides whether the GFL is 1. If GFL=1, the process further reads pixel data (Y, U, V) of the selected pixel at step ST55. Then, at step ST56, the process decides whether the pixel data (Y, U, V) is contained in a range of the data values yr, ur, and vr. If contained, at step ST57, the process assigns the pixel data of this pixel as the pixel data (Y, U, V) as it is and then goes to step ST58.

If not contained or GFL≠1 at the above-mentioned step ST54, at step ST59, the process assigns (0, 0, 0) as the pixel data (Y, U, V) and then goes to step ST58.

At step ST58, the process decides whether the selected pixel is the last pixel of a current frame. If it is not the last pixel, the process selects a next pixel at step ST60 and then returns to step ST53 to perform the same processing as described above. If it is the last pixel, the process finishes.

The following will describe operations of the telop extraction circuit 110 shown in FIG. 2.

The image signal Va as a telop extraction target is read out of the buffer memory 107 (see FIG. 1) and supplied to the motion information output portion 122 through the input terminal 121. This motion information output portion 122 obtains motion information ME indicating a horizontal moving distance in a line where the telop is present on a screen obtained by the image signal Va.

Further, to the decision information acquisition portion 123 also, the image signal Va as the telop extraction target is supplied through the input terminal 121. This decision information acquisition portion 123 has a counter corresponding to each pixel of a screen. At this decision information acquisition portion 123, based on the motion information ME for each line output from the motion information output portion 122, motion compensation is performed on the signals Vap, Van. The signal Vap is signal of one frame before the image signal Va in timing and the signal Van is signal of one frame after it in timing. The decision information acquisition portion 123 then decides whether each of the pixels constituting a screen obtained by the signal Vac from the signal Vac of the current frame and the signals Vap' and Van' on which motion compensation has been performed, is a pixel of an edge position of the telop. Then, at the decision information acquisition portion 123, based on its decision result, increment processing or decrement processing of the counter is performed to obtain a count value CN for making a final decision-on whether each of the pixels of the screen is that of an edge position of the telop.

A count value CN of the counter, which is present at the count portion 145 of this decision information acquisition portion 123 and corresponds to each of the pixels of the screen, is supplied to the binarizing processing portion 124 as decision information. At this binarizing processing portion 124, a count value of the counter corresponding to each of the pixels of the screen is binarized using the predetermined threshold value TH, for example, 3 to obtain an edge position flag EFL indicating whether each of the pixels of a screen obtained by a signal component of the current frame of the image signal Va is a pixel of an edge position of the telop.

The edge position flag EFL obtained at the binarizing processing portion 124 is supplied to the edge pixel extraction portion 125. This edge pixel extraction portion 125 is also supplied with the image signal Va as a telop extraction target through the input terminal 121. At this edge pixel extraction portion 125, based on the edge position flag EFL, pixel data corresponding to the pixel of the edge position of the telop is extracted from the items of pixel data constituting the signal component of the current frame of the image signal Va (see FIGS. 11A–11C).

The pixel data corresponding to the pixel of the edge position of the telop extracted by this edge pixel extraction portion 125 is supplied to the histogram-processing portion 126. At this histogram-processing portion 126, based on the pixel data corresponding to the pixel of the edge position of the telop, a histogram is created for each of the items of data Y, U, and V. Based on the histogram, data values yr, ur, and vr of the items of data Y, U, and V that constitute the pixel data corresponding to the telop are determined.

Further, the count value CN of the counter which are present at the counter portion 145 of the decision information acquisition portion 123 and corresponds to each of the pixels is supplied to the extraction region selection portion 127. At this extraction region selection portion 127, based on the count value CN of the counter which corresponds to each pixel of the screen, a region from which the pixel data corresponding to the telop is extracted is selected. From this extraction region selection portion 127, an extraction region flag GFL, which is set to one state, for example, 1 in accordance with a line where the telop is present is obtained (see FIG. 17B).

The data values yr, ur, and vr obtained at the histogram-processing portion 126 are supplied to the extraction portion 128. Further, the extraction region flag GFL obtained at the extraction region selection portion 127 is supplied to the extraction portion 128. Furthermore, this extraction portion 128 is also supplied with the image signal Va as a telop extraction target through the input terminal 121.

At this extraction portion 128, among the pixel data constituting the signal component of the current frame of the image signal Va, pixel data of a pixel such that the extraction region flag GFL becomes 1 and data value of each of the items of data Y, U, and V is contained in a range of the data values yr, ur, and vr is extracted as pixel data (Y, U, V) that corresponds to the telop.

In such a manner, the pixel data (Y, U, V) corresponding to a telop that is extracted at the extraction portion 128 is derived to the output terminal 129. That is, at the output terminal 129, the image signal Vb constituted of the pixel data (Y, U, V), which corresponds to the telop, is output.

Figure 20:
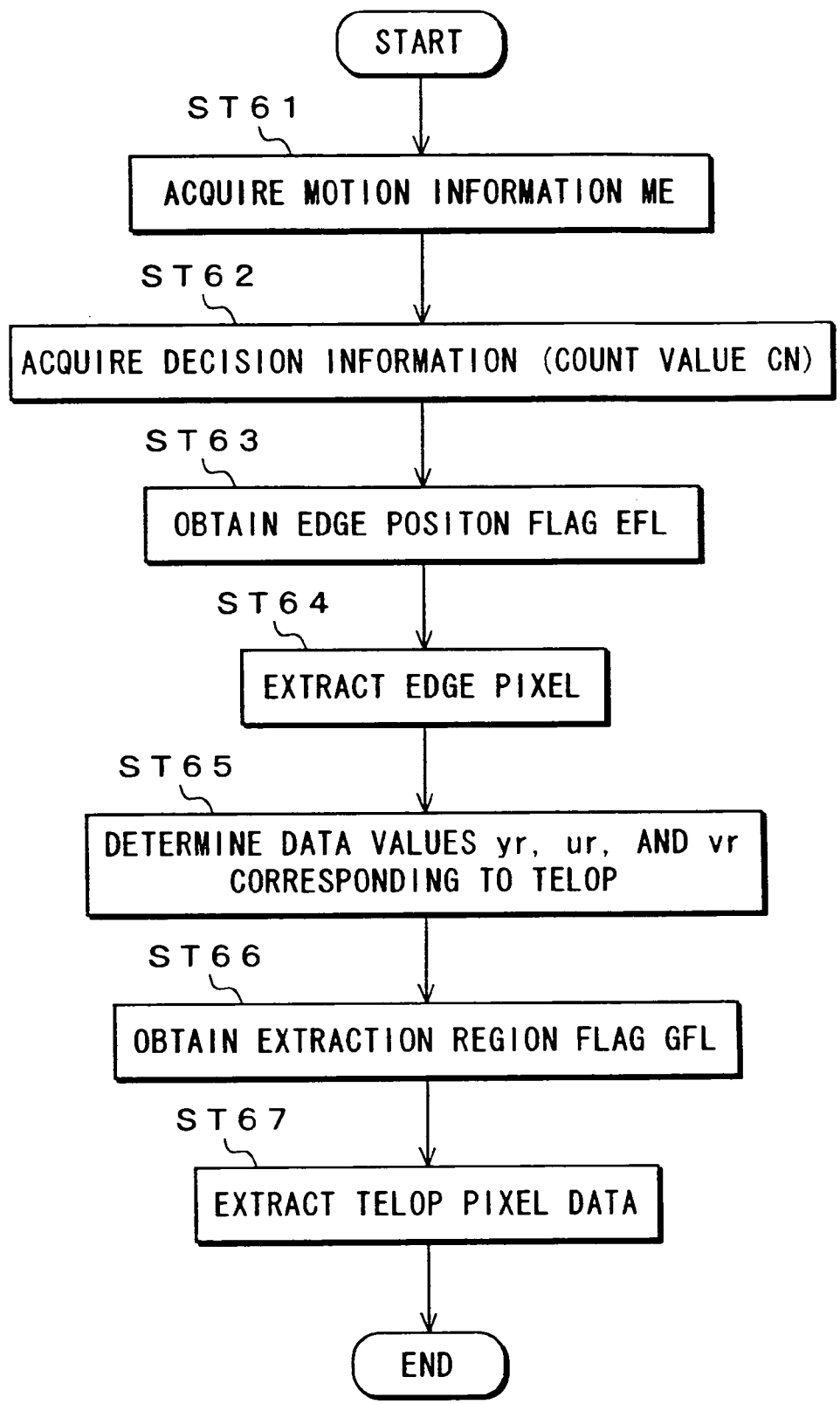
FIG. 20 is a flowchart for showing telop pixel data extraction processing at a telop extraction circuit.

A flowchart of FIG. 20 shows telop pixel data extraction processing performed by a telop extraction circuit 110.

First, at step ST61, on a screen obtained by the image signal Va, motion information ME indicating a horizontal moving distance in a line where the telop is present is acquired (which corresponds to processing at the motion information output portion 122).

At step ST62, based on the motion information ME obtained at step ST61, the process performs motion compensation on the signal Vap that is one frame before the image signal Va and the signal Van that is one frame after it in timing to decide whether each of the pixels which constitute a screen obtained by the signal Vac is a pixel of an edge position of the telop from the signal Vac of the current frame and the signals Vap', Van' on which motion compensation has been performed and, based on this decision result, performs increment or decrement processing for the counter to obtain a count value CN as decision information which is used to make final decision on whether each pixel of the screen is a pixel of the edge position of the telop (which corresponds to processing by the decision information acquisition portion 123).

At step ST63, the process binalizes the count value CN of the counter which corresponds to each pixel of the screen obtained at step ST62 using a predetermined threshold value TH, for example, 3 to obtain an edge position flag EFL indicating whether each pixel of the screen obtained by the signal component of the current frame of the image signal Va is a pixel of an edge position of the telop (which corresponds to binarizing processing by binarizing processing portion 124).

At step ST64, based on the edge position flag EFL obtained at step ST63, the process extracts pixel data corresponding to the pixel of the edge position of the telop from the items of pixel data that constitute the signal component of the current frame of the image signal Va.

At step ST65, based on the pixel data corresponding to the pixel of the edge position of the telop extracted at step ST64, the process creates a histogram for each of the items of data Y, U, and V and, based on the histogram, determines data values yr, ur, and vr of the items of data Y, U, and V which constitute the pixel data corresponding to the telop (which corresponds to processing by the histogram-processing portion 126).

At step ST66, based on the count value CN of the counter which corresponds to each pixel of the screen obtained at step ST62, the process obtains a extraction region flag GFL which enters one state, for example, 1 corresponding to a line where the telop is present (which corresponds to processing by the extraction region selection portion 127).

At step ST67, based on the data values yr, ur, and vr determined at step ST65 and the extraction region flag GFL obtained at step ST66, the process extracts pixel data (Y, U, V) corresponding to the telop (which corresponds to processing by the extraction portion 128). In this case, from items of pixel data which constitutes the signal component of the current frame of the image signal Va, pixel data of the pixel such that the extraction region flag GEL becomes 1 and value of each of the items of data Y, U, and V is contained in a range of the data values yr, ur, and vr is extracted as pixel data (Y, U, V) corresponding to the telop.

In the telop extraction circuit 110 shown in FIG. 2, by utilizing properties and the like of the motion of the telop, the process detects an edge position of this telop and obtains data values of the items of data Y, U, and V which constitute pixel data corresponding to the telop from a histogram created using the pixel data of this edge position to extract pixel data corresponding to the telop using these data values yr, ur, and vr. This enables only the pixel data corresponding to the telop to be properly extracting from the image signal Va.

Further, at the telop extraction circuit 110 shown in FIG. 2, a result of decision obtained at the decision portion 143 of the decision information acquisition portion 123 (see FIG. 4) on whether each of the pixels of the screen is a pixel of the edge position of the telop is not used as it is. That is, based on this decision result, the process updates the count value CN of the counter which corresponds to each pixel of the screen for each frame and binarizes this count value CN to obtain an edge position flag EFL indicating whether each of the pixels of the screen is an pixel of an edge position of the telop. It is thus possible to improve reliabilities of decision on whether each of the pixels of the screen is a pixel of an edge position of the telop.

Figure 21:
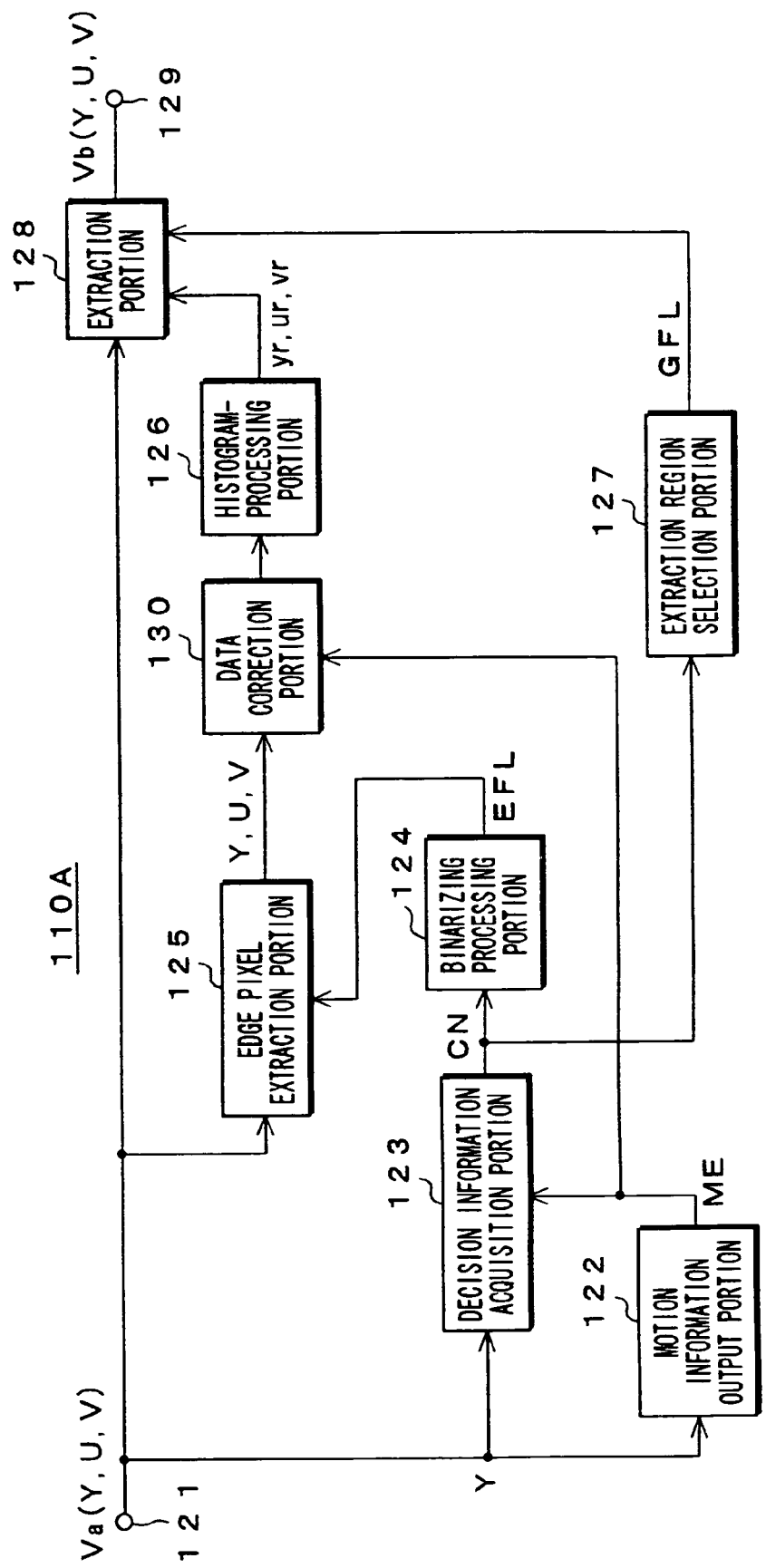
FIG. 21 is a block diagram for showing a configuration of another telop extraction circuit.

FIG. 21 shows another configuration of the telop extraction circuit 11A. In FIG. 21, components corresponding to those in FIG. 2 are given the same reference symbols and their detailed description is omitted. In this telop extraction circuit 110A, on the upstream side of the histogram-processing portion 126, a data correction portion 130 for performing correction processing on pixel data (Y, U, V) which corresponds to a pixel of an edge position of a telop extracted by the edge pixel extraction portion 125 is arranged, with the others being the same as the telop extraction circuit 110 shown in FIG. 2.

At this data correction portion 130, if a cross color or noise has an influence on the pixel data (Y, U, V) corresponding to a pixel of an edge position of the telop extracted by the edge pixel extraction portion 125, correction processing is performed to alleviate the influence.

That is, the data correction portion 130 is equipped with a memory (not shown) as storage unit for holding integral data. Accordingly, concerning pixel data of a target position of a current frame, this data correction portion 130 reads from the memory integral data corresponding to the pixel data of this target position and has been created one frame before in timing and mixes this integral data and the pixel data of the target position at a predetermined mixing ratio, to create corrected output pixel data. Further, the data correction portion 130 writes this output pixel data as integral data to be used in the next frame into an address corresponding to this target position in the above-mentioned memory.

Here, into which one of the addresses of the memory the integral data corresponding to the pixel data of the target position has been written can be known on the basis of the motion information ME output from the motion information output portion 122. Further, as for the mixing ratio, the higher a ratio of the integral data becomes, the more an influence of the cross color or noise can be alleviated; for example, the ratio of the pixel data of a target position is 0.2 and that of the integral data is 0.8.

The following will describe correction processing by the data correction portion 130 simply with reference to FIGS. 22A and 22B. As shown in FIG. 22A, it is assumed that data values of pixel (indicated by a symbol, •) of an edge position of a telop in the image signal Va are "100" in a frame t-2, "100" in a frame t-1, and "50" in a current frame (a frame t) due to an influence of a cross color or noise. Further, as shown in FIG. 22B, it is supposed that data values of integral data are "100" in a frame t-2 and "100" in a frame t-1. In this case, a data value of the integral data (output pixel data) of a current frame (frame t) is obtained by calculating: 0.8× 100+0.2×50=90, thereby alleviating influence of a cross color or noise.

As in the telop extraction circuit 110A shown in FIG. 21, arranging the data correction portion 130 on the upstream side of the histogram-processing portion 126 in configuration allows an influence of cross colors and noise on the pixel data (Y, U, V) supplied to the histogram-processing portion 126 to be alleviated.

Therefore, at the histogram-processing portion 126, pixel data (Y, U, V) to be supplied is used as a material to create a histogram and, based on this histogram, it is possible to determine the data values yr, ur, and vr of each of the items of data Y, U, and V which constitute pixel data corresponding to the telop. This enables determination processing for these data values yr, ur, and vr to be performed more accurately.

Figure 23A:
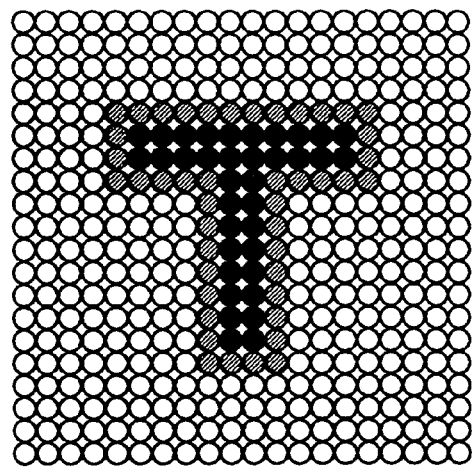
FIGS. 23A–23C are illustrations for explaining a case where a target telop has a fringe.
Figure 23B:
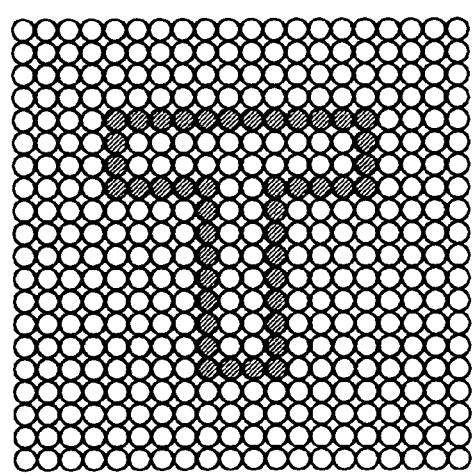
Figure 23C:
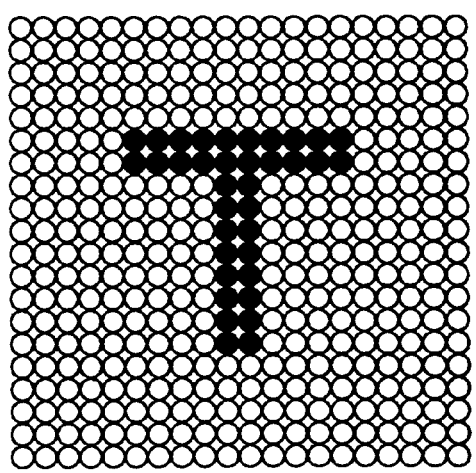

Although in the above embodiment, a telop having a single color has been described, also in the case of a telop having a fringe of any other color as shown, for example, in FIG. 23A, an edge of the telop (FIG. 23B) can be extracted similarly. Thus, if information of the edge is held separately so that information of an inside of the telop (FIG. 23C) can be obtained by any other method, pixel data corresponding to the fringed telop can be extracted similarly. For example, the information of the inside of the telop can be obtained similarly at the histogram-processing portion 126 using pixel data of a region enclosed by edges.

Further, although in the above embodiment, a telop having a single color has been described, if an inside of the telop has the same color as a background as shown in FIG. 24B, what can be decided to be a telop is an edge position of the telop. In this case, as shown in FIG. 24B, pixel data corresponding to a pixel of an edge position of the telop is to be extracted as pixel data corresponding to the telop.

Further, although in the above embodiment, such pixel data has been described as to comprise luminance data Y, blue color difference data U, and red color difference data V, the present invention is also applicable to such pixel data as to comprise red data R, green data G, and blue data B. In this case, at the telop extraction circuit 110 (see FIG. 2), in place of the luminance data Y, for example, the green data G can be used to decide whether each of the pixels of the screen is a pixel at an edge position. Further, at the histogram-processing portion 126, a histogram is created for each of the items of data R, G, and B and, based on it, data value of each of the items of data R, G, and B which constitute pixel data corresponding to the telop is determined.

Further, in the above embodiment, pixel data corresponding to a telop is extracted from the image signal Va and an image signal Vb constituted of this extracted pixel data is stored in the HDD111, so that at a user-desired timing, this image signal Vb is read out of the HDD111 to enable a telop due to the image signal Vb to be displayed on the display portion 109. In addition to it, by recording an image signal Vb constituted of pixel data corresponding to the extracted telop, for example, in an HDD together with program information and retrieving the program information as a keyword, it becomes possible to display on the display portion 109 a telop which corresponds to the program information in configuration based on the image signal Vb. Further, a telop due to the image signal Vb may be displayed on a display portion different from the display portion 109 for displaying an image due to the image signal Va.

While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An apparatus for extracting pixel data corresponding to an artificial image from an input image signal, said pixel data including multiple items of color data, said apparatus comprising:

motion-information-outputting unit for outputting information of a horizontal moving distance in a line where the artificial image is present on a screen obtained from the input image signal;

motion compensation unit for performing motion compensation on signal components of frames, which are present in timing before and after a current frame of the input image signal, based on the information of the moving distance output from the motion-information-outputting unit;

detecting unit for detecting whether each pixel of a screen obtained from a signal component of the current frame of the input image signal is a pixel that is present at an edge position of the artificial image, based on the signal component of the current fame of the input image signal and the signal components, which have been compensated in terms of motion by the motion compensation unit, of the frames which are present in timing before and after the current frame of the input image signal;

edge pixel extractor for extracting pixel data corresponding to the pixel of the edge position of the artificial image among items of pixel data constituting the signal component of the current frame of the input image signal, based on a detection result of the detecting unit;

histogram processor for creating a histogram using the items of pixel data extracted by the edge pixel extractor and for obtaining data values of multiple items of color data that constitutes the pixel data corresponding to the artificial image, based on the histogram;

extraction region selector for selecting an extraction region flag, said extraction region flag entering one state in accordance with the line where said artificial image is preset in the screen obtained by said input image signal; and extractor for extracting pixel data, from items of pixel data that constitute a signal component of a current frame of said input image signal, of the line by which said extraction region flag selected by said extraction region selector enters said one state, said pixel data of the line being constituted of multiple items of color data, said multiple items of color data each matching a data value obtained by said histogram processor, as the pixel data corresponding to the artificial image.

2. The apparatus according to claim 1, wherein the detecting unit detects whether each pixel of a target position in a screen obtained by a signal component of a current frame of the input image signal is a pixel of an edge position corresponding to the artificial image, based on a pattern indicating a relationship in level among multiple items of pixel data positioned in the vicinity of a target position in each of the current frame of the input image signal and the frames thereof coming before and after the current frame in timing respectively.

3. The apparatus according to claim 1, wherein the detecting unit has:
a detection portion for detecting whether each pixel of a screen obtained by a signal component of a current frame of the input image signal is a pixel of an edge position of the artificial image based on a signal component of the current frame of said input image signal and signal components of frames which are present before and after the current frame of the input image signal, said signal components of frames being motion-compensated by the motion compensation unit;

a counter portion including a counter corresponding to each pixel of a screen, said counter updating its count value in accordance with a decision of said decision portion on whether pixel is a pixel of the edge position of said artificial image: and a binarizing processing portion for binarizing the updated count value of said counter corresponding to each pixel of the screen, said counter being present at the counter portion, to obtain an edge position flag as a decision result, said edge position flag indicating whether each pixel of said screen obtained by the signal component of the current frame of the input image signal is a pixel of the edge position of the artificial image.

4. The apparatus according to claim 1, wherein based on each item of the pixel data extracted by said edge pixel extractor, for each of the multiple items of color data, said histogram processor sub-divides the data value as a variable into a predetermined number of classes to create a histogram, said histogram using, as a frequency, the number of items of the data belonging to each of the classes and said histogram processor sets data value corresponding to a class, said class indicating maximum frequency for each histogram, to be data value of multiple items of color data that constitutes pixel data corresponding to the artificial image.

5. The apparatus according to claim 4, wherein the histogram processor determines a width of the class of said histogram for each item of the color data based on a variance value of each item of said color data.

6. The apparatus according to claim 1, further comprising data corrector for performing correction processing on first pixel data on an upstream side of the histogram processor, said first pixel data being extracted by said edge pixel extractor, said data corrector having:
storage unit for holding second pixel data serving as integration data;
data reader for reading the second pixel data written one frame before in timing out of said storage unit, said read second pixel data corresponding to the first pixel data, based on the information of moving distance output from said motion-information-outputting unit;
mixer for mixing said first pixel data and said second pixel data read out of said data reader, at a predetermined mixing ratio to obtain output pixel data; and
data writer for writing the output pixel data obtained by said mixer into said storage unit as said second pixel data.

7. The apparatus according to claim 1, wherein said artificial image is a telop.

8. An apparatus for extracting pixel data corresponding to an artificial image from an input image signal, said pixel data including multiple items of color data, said apparatus comprising:
motion-information-outputting means for outputting information of a horizontal moving distance in a line where the artificial image is present on a screen obtained from the input image signal;
motion compensation means for performing motion compensation on signal components of frames, which are present in timing before and after a current frame of the input image signal, based on the information of the moving distance output from the motion-information-outputting means;
detecting means for detecting each pixel of a screen obtained from a signal component of the current frame of the input image signal is a pixel that is present at an edge position of the artificial image, based on the signal component of the current fame of the input image signal and the signal components, which have been compensated in terms of motion by the motion compensation means, of the frames which are present in timing before and after the current frame of the input image signal;

edge-pixel-extracting means for extracting pixel data corresponding to the pixel of the edge position of the artificial image among items of pixel data constituting the signal component of the current frame of the input image signal, based on a decision result of the detecting means;

histogram-processing means for creating a histogram using the items of pixel data extracted by the edge-pixel-extracting means and for obtaining data values of multiple items of color data that constitutes the pixel data corresponding to the artificial image, based on the histogram;

extraction-region-selecting means for selecting an extraction region flag, said extraction region flag entering one state in accordance with the line where said artificial image is preset in the screen obtained by said input image signal; and extracting means for extracting pixel data, from items of pixel data that constitute a signal component of a current frame of said input image signal, of the line by which said extraction region flag selected by said extraction-region-selecting means enters said one state, said pixel data of the line being constituted of multiple items of color data, said multiple items of color data each matching a data value obtained by said histogram-processing means, as the pixel data corresponding to the artificial image.

9. A method for extracting pixel data corresponding to an artificial image from an input image signal, said pixel data including multiple items of color data, said method comprising the steps of:

obtaining information of a horizontal moving distance in a line on a screen obtained from the input image signal, said line including the artificial image;

performing motion compensation on signal components of frames, said frames being present in timing before and after a current frame of the input image signal, based on the information of the moving distance obtained at the information obtaining step;

detecting whether each pixel in a screen obtained from a signal component of the current frame of the input image signal is a pixel of an edge position of the artificial image, based on the signal component of the current fame of said input image signal and the signal components of the frames which are present in timing before and after the current frame of the input image signal, said signal components of the frames being motion-compensated in the motion compensation performing step;

extracting pixel data corresponding to the pixel of the edge position of the artificial image among items of the pixel data constituting the signal component of the current frame of the input image signal, based on a decision result at the detecting step;

creating a histogram using the items of pixel data extracted at said pixel data extracting step and, based on said histogram, obtaining data values of said multiple items of color data that constitutes the pixel data corresponding to the artificial image;

obtaining an extraction region flag which enters one state in accordance with the line in the screen obtained from the input image signal, said line including said artificial image; and extracting pixel data of the line by which the extraction region flag obtained at the extraction region flag obtaining step enters said one state, said pixel data being constituted of multiple items of color data matching the data value obtained at the histogram creating step, among items of pixel data that constitutes a signal component of the current frame of the input image signal, as the pixel data corresponding to said artificial image.

10. A computer-readable storage medium storing a program for causing a computer to perform a method for extracting pixel data corresponding to an artificial image from an input image signal, said pixel data including multiple items of color data, said method comprising the steps of:

obtaining information of a horizontal moving distance in a line on a screen obtained from the input image signal, said line including the artificial image;

performing motion compensation on signal components of frames, said frames being present in timing before and after a current frame of the input image signal, based on the information of the moving distance obtained at said information obtaining step;

detecting whether each pixel in a screen obtained from a signal component of the current frame of the input image signal is a pixel of an edge position of the artificial image, based on the signal component of the current fame of said input image signal and the signal components of the frames which are present in timing before and after the current frame of the input image signal, said signal components of the frames being motion-compensated in the motion compensation performing step;

extracting pixel data corresponding to the pixel of the edge position of the artificial image among items of the pixel data constituting the signal component of the current frame of the input image signal, based on a decision result at the detecting step;

creating a histogram using the items of pixel data extracted at said pixel data extracting step and, based on said histogram, obtaining data values of said multiple items of color data that constitutes the pixel data corresponding to the artificial image;

obtaining an extraction region flag which enters one state in accordance with the line in the screen obtained from the input image signal, said line including said artificial image; and extracting pixel data of the line by which the extraction region flag obtained at the extraction region flag obtaining step enters said one state, said pixel data being constituted of multiple items of color data matching the data value obtained at the histogram creating step, among items of pixel data that constitutes a signal component of the current frame of the input image signal, as the pixel data corresponding to said artificial image.

11. A computer readable storage medium in which stored is a computer program for causing a computer to perform a method for extracting pixel data corresponding to an artificial image from an input image signal, said pixel data including multiple items of color data, said method comprising the steps of:

obtaining information of a horizontal moving distance in a line on a screen obtained from the input image signal, said line including the artificial image;

performing motion compensation on signal components of frames, said frames being present in timing before and after a current frame of the input image signal, based on the information of the moving distance obtained at said information obtaining step;

detecting whether each pixel in a screen obtained from a signal component of the current frame of the input image signal is a pixel of an edge position of the artificial image, based on the signal component of the current fame of said input image signal and the signal components of the frames which are present in timing before and after the current frame of the input image signal, said signal components of the frames being motion-compensated in the motion compensation performing step;

extracting pixel data corresponding to the pixel of the edge position of the artificial image among items of the pixel data constituting the signal component of the current frame of the input image signal, based on a decision result at the detecting step;

creating a histogram using the items of pixel data extracted at said pixel data extracting step and, based on said histogram, obtaining data values of said multiple items of color data that constitutes the pixel data corresponding to the artificial image;

obtaining an extraction region flag which enters one state in accordance with the line in the screen obtained from the input image signal, said line including said artificial image; and extracting pixel data of the line by which the extraction region flag obtained at the extraction region flag obtaining step enters said one state, said pixel data being constituted of multiple items of color data matching the data value obtained at the histogram creating step, among items of pixel data that constitutes a signal component of the current frame of the input image signal, as the pixel data corresponding to said artificial image.

* * * * *

UNITED STATES PATENT AND TRADEMARK OFFICE
CERTIFICATE OF CORRECTION

PATENT NO. : 7,136,527 B2  
APPLICATION NO. : 10/820886  
DATED : November 14, 2006  
INVENTOR(S) : Masaru Ikeda et al.

It is certified that error appears in the above-identified patent and that said Letters Patent is hereby corrected as shown below:

Column 13, line 60, change "a2" to --$\sigma^2$--.

Column 20, line 49, change "GEl" to --GFL--.

Column 21, line 11, change "11A" to --110A--.

Column 23, line 15, change "fame" to --frame--.

Column 24, line 65, change "fame" to --frame--.

Column 25, line 48, change "fame" to --frame--.

Column 26, line 28, change "fame" to --frame--.

Column 27, line 8, change "fame" to --frame--.

Signed and Sealed this

Eighth Day of May, 2007

JON W. DUDAS  
*Director of the United States Patent and Trademark Office*